(12) United States Patent
Kukura et al.

(10) Patent No.: US 12,189,105 B2
(45) Date of Patent: *Jan. 7, 2025

(54) INTERFEROMETRIC SCATTERING MICROSCOPY

(71) Applicant: Oxford University Innovation Limited, Oxford (GB)

(72) Inventors: Philipp Kukura, Oxford (GB); Alexander Weigel, Garching bei Munich (DE); Justin Benesch, Oxford (GB)

(73) Assignee: Oxford University Innovation Limited, Oxford (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/144,372

(22) Filed: May 8, 2023

(65) Prior Publication Data

US 2023/0359009 A1    Nov. 9, 2023

Related U.S. Application Data

(63) Continuation of application No. 16/992,350, filed on Aug. 13, 2020, now abandoned, which is a
(Continued)

(30) Foreign Application Priority Data

Jul. 13, 2016   (GB) ..................... 1612182

(51) Int. Cl.
*G02B 21/00* (2006.01)
*G01G 9/00* (2006.01)
(Continued)

(52) U.S. Cl.
CPC ......... *G02B 21/0032* (2013.01); *G01G 9/005* (2013.01); *G01N 15/1434* (2013.01);
(Continued)

(58) Field of Classification Search
CPC ............ G02B 21/0032; G02B 21/0004; G02B 21/008; G02B 21/082; G02B 21/14;
(Continued)

(56) References Cited

U.S. PATENT DOCUMENTS 8,705,040 B2 * 4/2014 Trainer ................. G01B 11/08
356/450
10,775,597 B2   9/2020 Kukura et al.
(Continued)

FOREIGN PATENT DOCUMENTS

JP    H0416801 A    1/1992
JP    2000-249816 A    9/2000
(Continued)

OTHER PUBLICATIONS

Andrecka et al., "Direct observation and control of supported lipid bilayer formation with interferometric scattering microscopy," ACS Nano. 7(12):10662-70 (2013).
(Continued)

*Primary Examiner* — Mustak Choudhury
(74) *Attorney, Agent, or Firm* — Clark & Elbing LLP

(57) ABSTRACT

An interferometric scattering microscope is adapted by performing spatial filtering of output light, which comprises both light scattered from a sample location and illuminating light reflected from the sample location, prior to detection of the output light. The spatial filtering passes the reflected illumination light but with a reduction in intensity that is greater within a predetermined numerical aperture than at larger numerical apertures. This enhances the imaging contrast for coherent illumination, particularly for objects that are weak scatterers.

20 Claims, 15 Drawing Sheets

Related U.S. Application Data continuation of application No. 16/107,551, filed on Aug. 21, 2018, now Pat. No. 10,775,597, which is a continuation-in-part of application No. PCT/GB2017/052070, filed on Jul. 13, 2017.

(51) Int. Cl.
*G01N 15/1434* (2024.01)
*G02B 21/08* (2006.01)
*G02B 21/14* (2006.01)
*G02B 21/26* (2006.01)
*G02B 21/36* (2006.01)

(52) U.S. Cl.
CPC ....... *G02B 21/0004* (2013.01); *G02B 21/008* (2013.01); *G02B 21/082* (2013.01); *G02B 21/14* (2013.01); *G02B 21/26* (2013.01); *G02B 21/36* (2013.01); *G02B 21/361* (2013.01)

(58) Field of Classification Search
CPC ...... G02B 21/26; G02B 21/36; G02B 21/361; G02B 21/0056; G02B 21/06; G01G 9/005; G01N 15/1434; A61B 5/0066
See application file for complete search history.

(56) References Cited

U.S. PATENT DOCUMENTS

| | | | |
|---|---|---|---|
| 2003/0058530 A1 | 3/2003 | Kawano | |
| 2004/0170618 A1* | 9/2004 | Davis | A61P 25/04 435/219 |
| 2005/0105097 A1* | 5/2005 | Fang-Yen | G01B 9/02063 356/497 |
| 2006/0024722 A1 | 2/2006 | Fischer-Colbrie et al. | |
| 2006/0127010 A1* | 6/2006 | Allen | G02B 6/2852 385/48 |
| 2007/0195330 A1* | 8/2007 | Ohashi | G01N 21/4795 356/498 |
| 2009/0323056 A1* | 12/2009 | Yun | G01J 3/26 356/326 |
| 2011/0134521 A1* | 6/2011 | Truong | G02B 21/367 359/388 |
| 2012/0188358 A1 | 7/2012 | Kimura | |
| 2013/0130307 A1 | 5/2013 | Sugiyama et al. | |
| 2014/0210983 A1 | 7/2014 | Shimura et al. | |
| 2019/0004299 A1 | 1/2019 | Kukura et al. | |
| 2020/0386975 A1 | 12/2020 | Kukura et al. | |

FOREIGN PATENT DOCUMENTS

| | | |
|---|---|---|
| JP | 2003098439 A | 4/2003 |
| JP | 2012150301 A | 8/2012 |
| JP | 2013044879 A | 3/2013 |
| WO | WO-02/10831 A2 | 2/2002 |
| WO | WO-2004/072695 A2 | 8/2004 |
| WO | WO-2011/132586 A1 | 10/2011 |
| WO | WO-2015/059682 A1 | 4/2015 |
| WO | WO-2018/019934 A1 | 2/2018 |

OTHER PUBLICATIONS

Benford et al., "Phase Contrast Microscopy for Opaque Specimens," J. Opt. Soc. Am. 40(5):314-6 (1950).

Cole et al., "Label-Free Single-Molecule Imaging with Numerical-Aperture-Shaped Interferometric Scattering Microscopy," ACS Photonics. 4(2):211-6 (Jan. 2017).

Jacobsen et al., "Interferometric optical detection and tracking of very small gold nanoparticles at a water-glass interface," Opt Express. 14(1):405-14 (2006).

Kukura et al., "High-speed nanoscopic tracking of the position and orientation of a single virus," Nat Methods. 6(12):923-7 (2009) (8 pages).

Liebel et al., "Ultrasensitive Label-Free Nanosensing and High-Speed Tracking of Single Proteins," published in final edited form as: Nano Lett. 17(2):1277-81 (Jan. 2017) (12 pages).

Lipson et al., "12.4 Applications of the Abbe theory: Spatial filtering" In: "Optical Physics," Cambridge University Press, UK, XP055312812, ISBN: 978-0-521-49345-1 pp. 425-438, p. 426, last five lines of penultimate paragraph; figures 12.17(a), 12.27 Jan. 1, 2011 (Jan. 1, 2011).

Ortega Arroyo et al., "Interferometric scattering microscopy and its combination with single-molecule fluorescence imaging," Nat Protoc. 11(4):617-33 (Mar. 2016).

Ortega-Arroyo et al., "Interferometric scattering microscopy (ISCAT): new frontiers in ultrafast and ultrasensitive optical microscopy," Phys Chem Chem Phys. 14(45):15625-36 (2012) (13 pages).

Piliarik et al., "Direct optical sensing of single unlabelled proteins and super-resolution imaging of their binding sites," Nat Commun. 5:4495 (2014) (8 pages).

Pluta, "Chapter 5. Phase Contrast Microscopy & Chapter 6. Amplitude Contrast, Dark-Field, and Other Related Techniques" In: "Advanced Light Microscopy," PWN-Polish Scientific Publishers, Elsevier, Poland, XP055313917, ISBN: 978-0-444-98918-5, pp. 3, 10-12, 22, 30, 75, 110, and 111, Jan. 1, 1989 (Jan. 1, 1989).

Santamaria et al., "Noise-free contrast improvement with a low frequency polarizing filter: a practical evaluation," Appl Opt. 16(6):1513-20 (1977).

Sarafis, "Phase Imagining in Plant Cells and Tissues," Biomedical Optical Phase Microscopy and Nanoscopy, edited by Zeev Zalevsky, pp. 53-68 (2013).

* cited by examiner

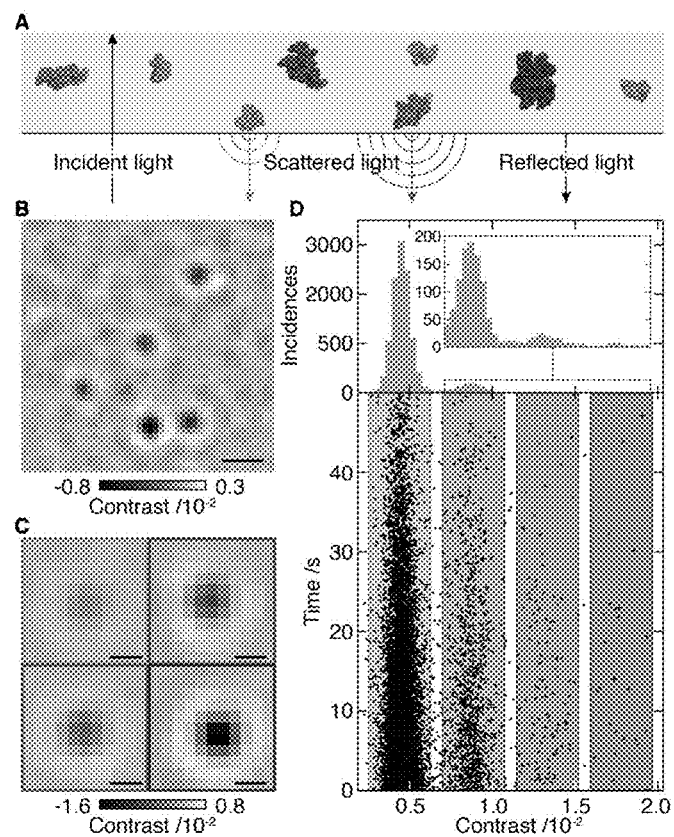
Fig. 11A-D
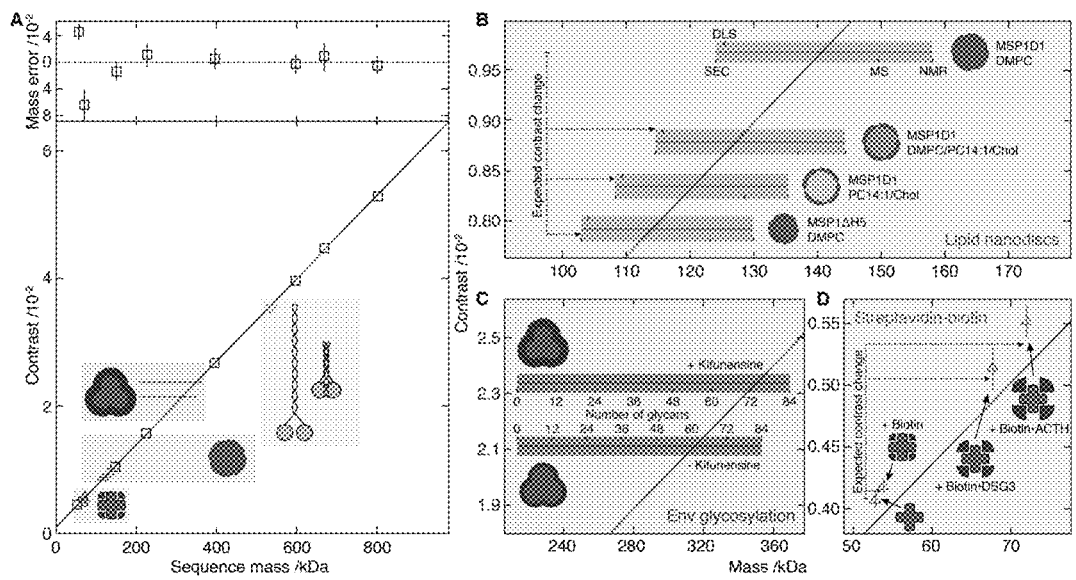
Fig. 12A-D

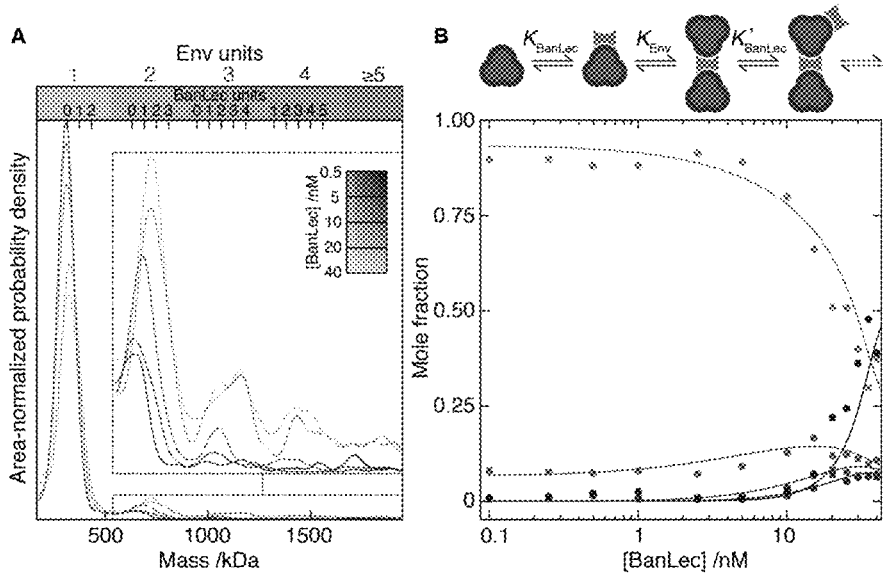
Fig. 13A-B
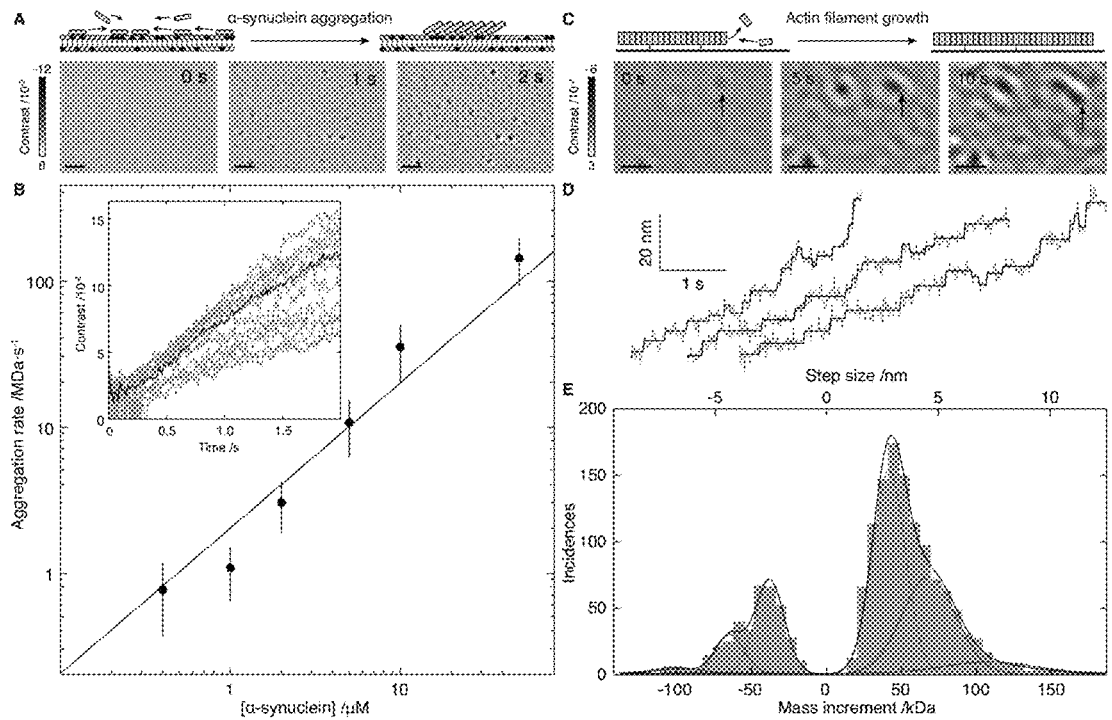
Fig. 14A-E

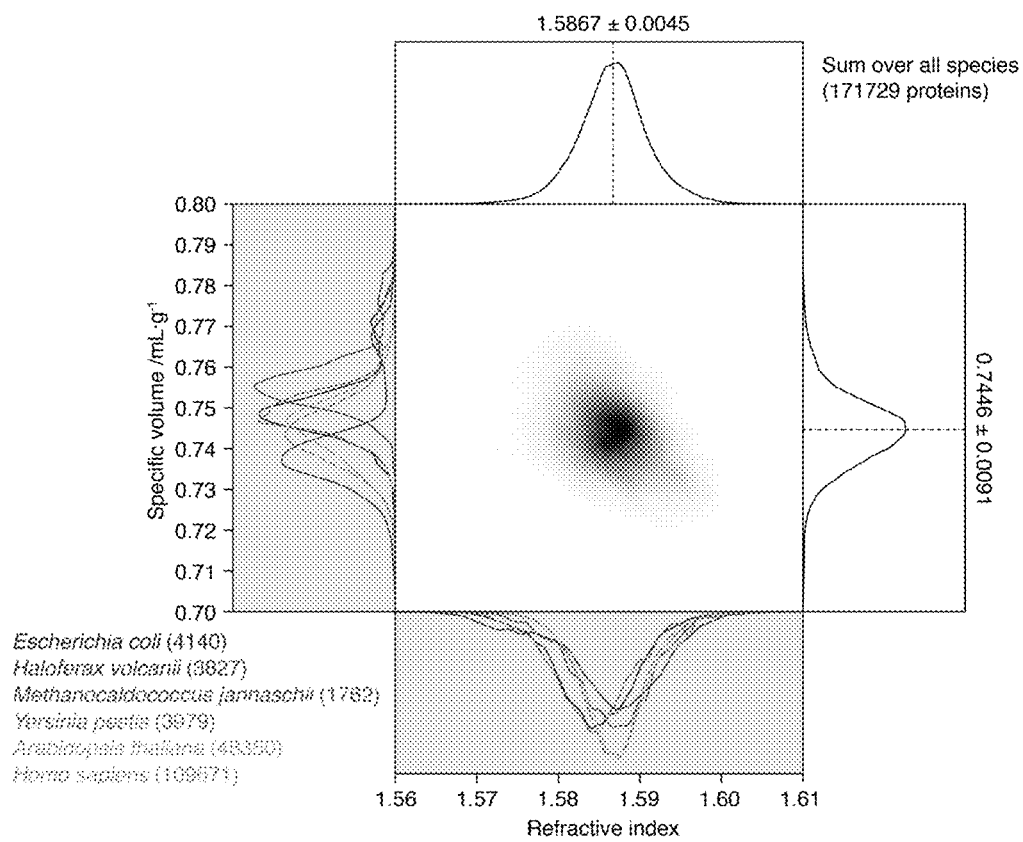
Fig. 15
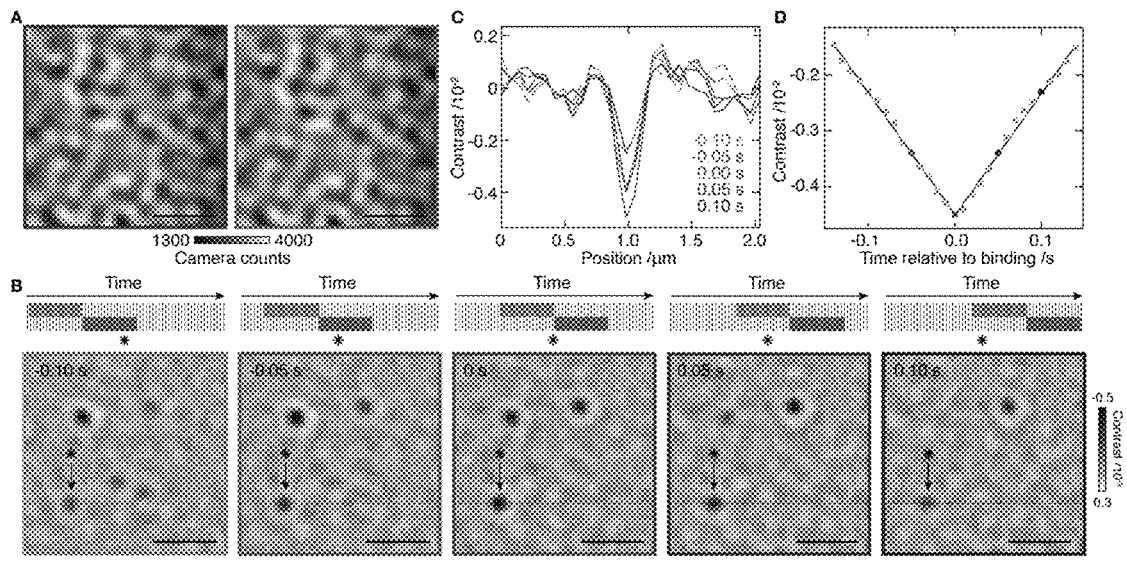
Fig. 16A-D

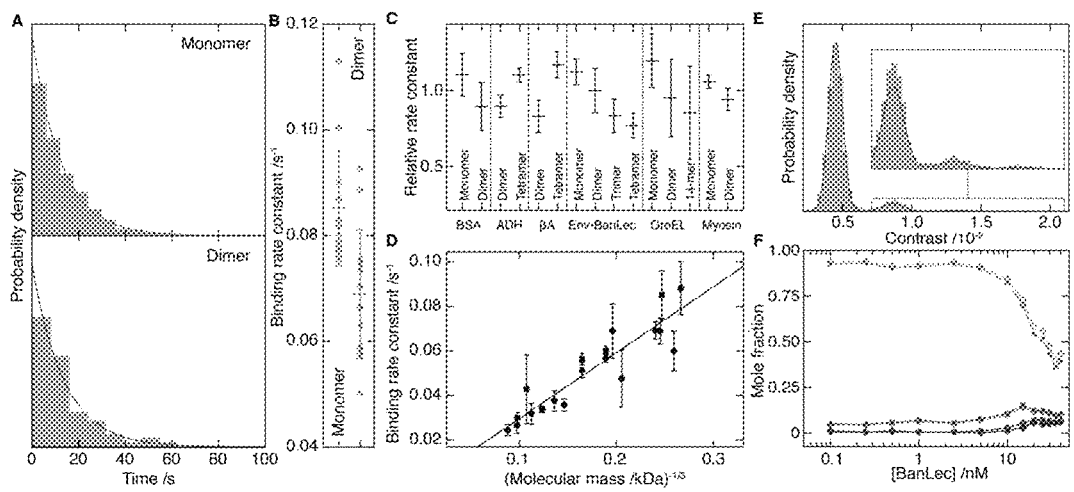
Fig. 17A-F
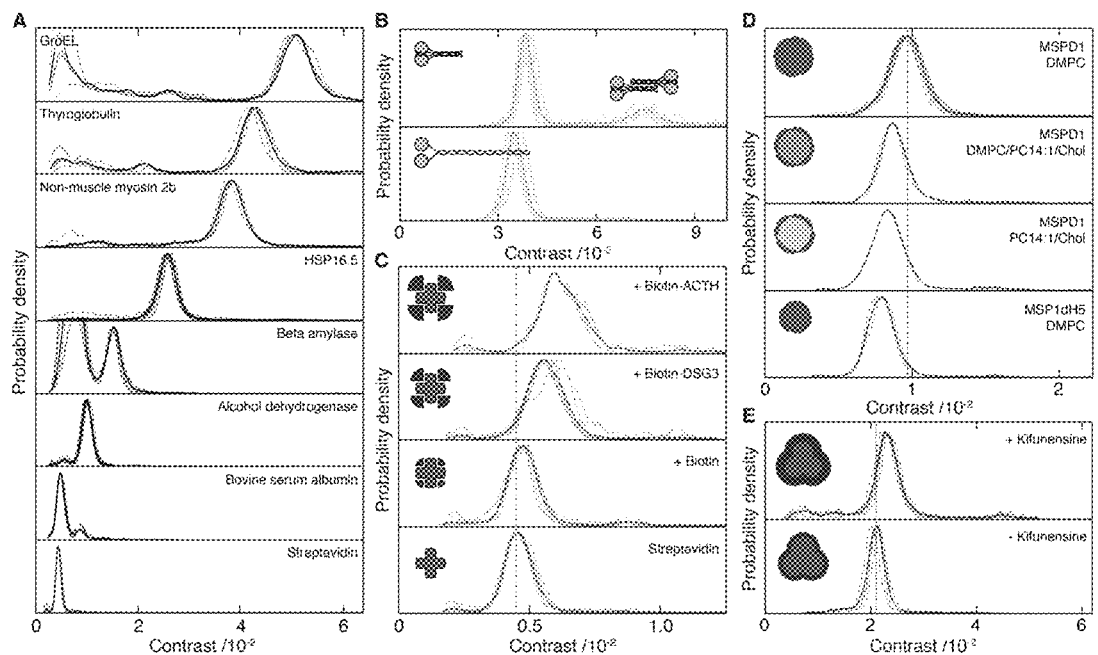
Fig. 18A-E

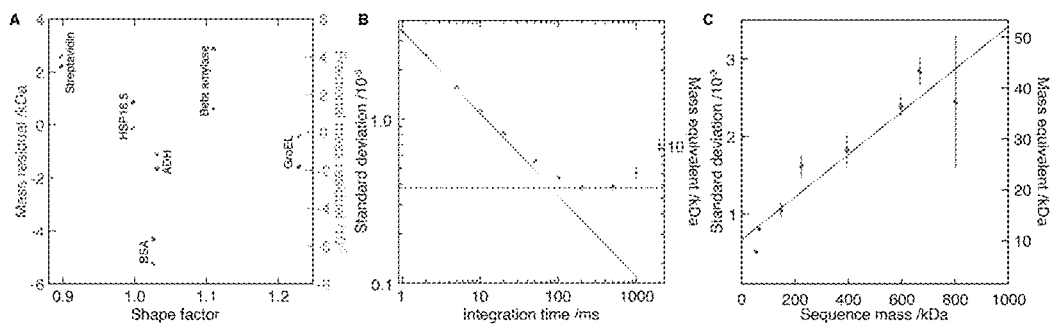
Fig. 19A-C
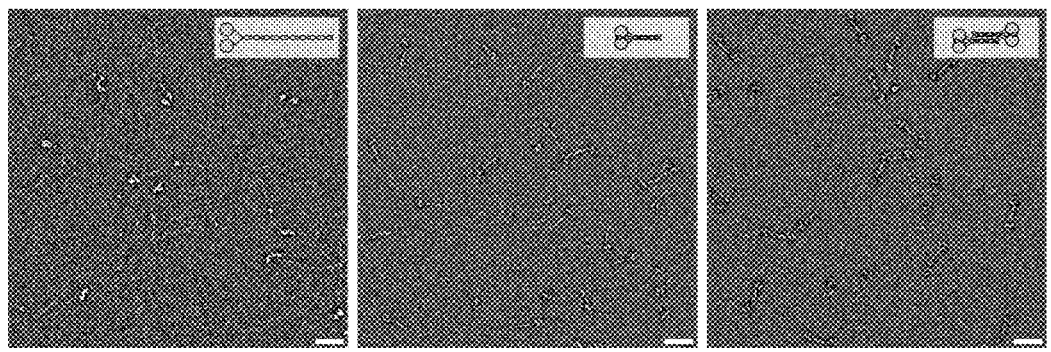
Fig. 20
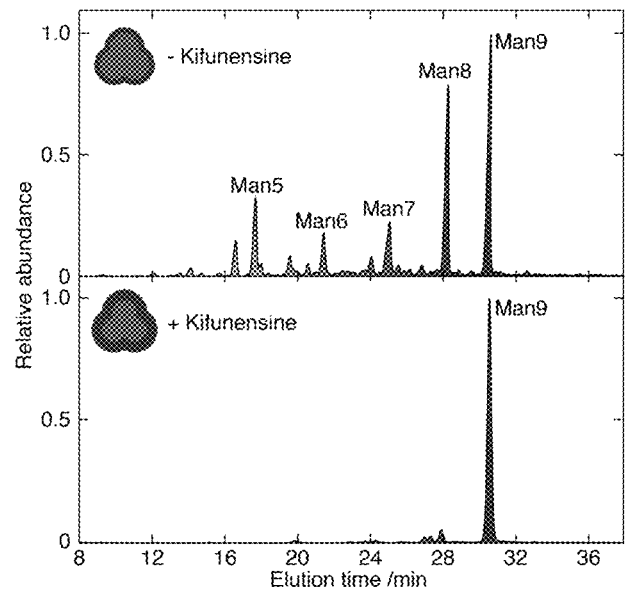
Fig. 21

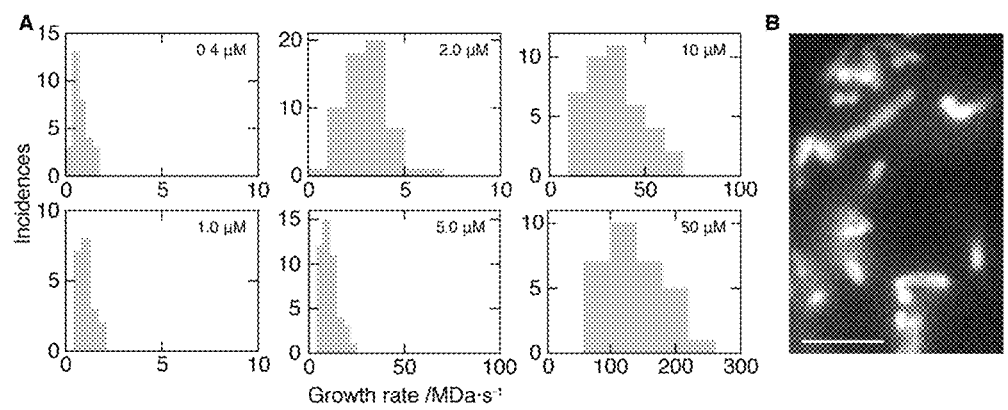
Fig. 22A-B

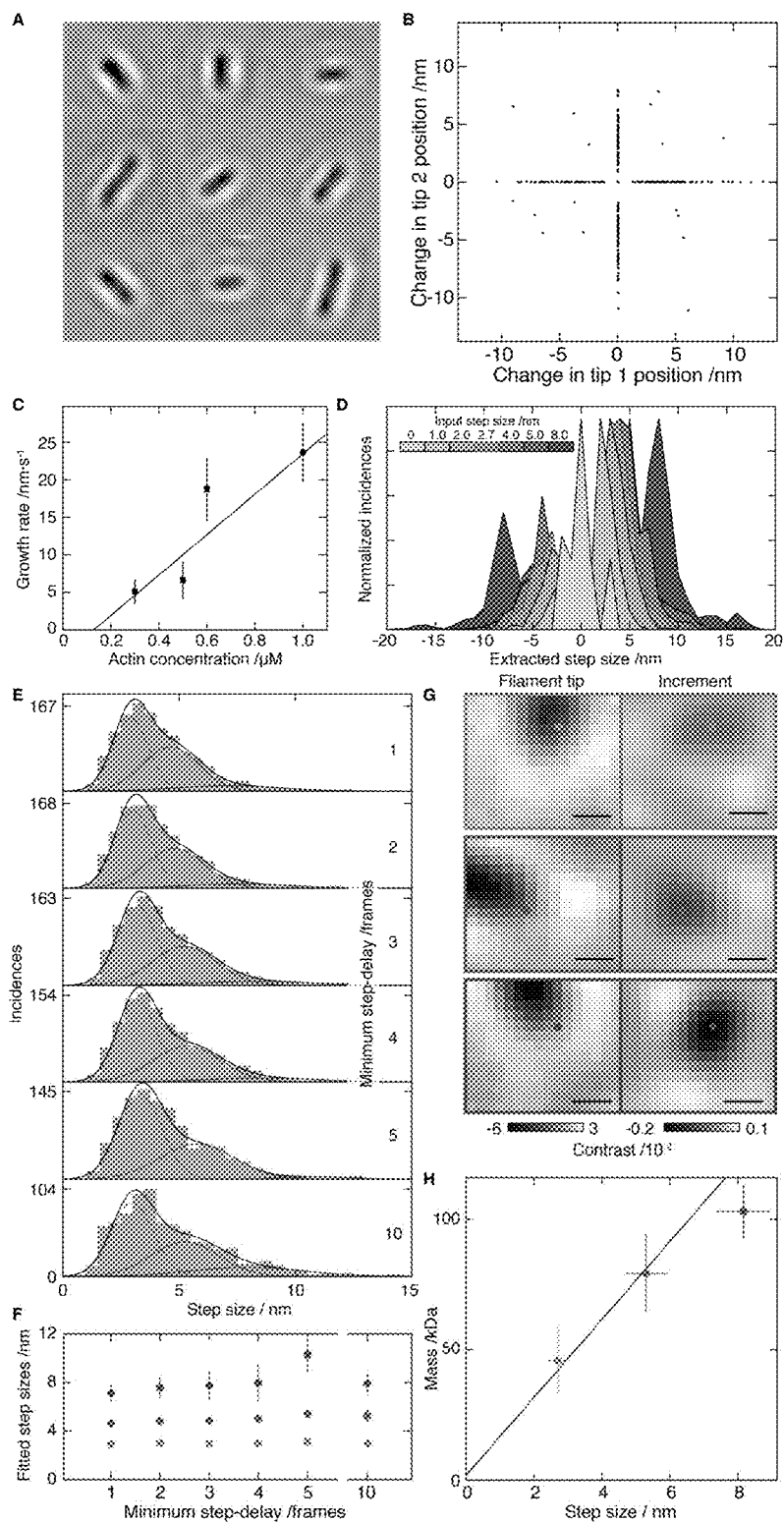
Fig. 23A-H

INTERFEROMETRIC SCATTERING MICROSCOPY

The present invention relates to interferometric scattering microscopy (referred to herein as iSCAT).

iSCAT has materialized as a powerful approach to both single particle tracking with unique spatiotemporal resolution and label-free sensitivity down to the single molecule level. iSCAT is disclosed, for example in Kukura et al., "High-speed nanoscopic tracking of the position and orientation of a single virus", Nature Methods 2009 6:923-935, and in Ortega-Arroyo et al. "Interferometric scattering microscopy (iSCAT): new frontiers in ultrafast and ultrasensitive optical microscopy", Physical Chemistry Chemical Physics 2012 14:15625-15636. Despite considerable potential, widespread application of iSCAT has been limited by the requirement for custom-built microscopes, unconventional cameras and complex sample illumination, limiting that capabilities of iSCAT for the robust and accurate detection, imaging and characterisation of objects as small as single molecules.

According to a first aspect of the present invention, there is provided an interferometric scattering microscope comprising: a sample holder for holding a sample in a sample location; an illumination source arranged to provide illuminating light; a detector; an optical system being arranged to direct illuminating light onto the sample location and being arranged to collect output light in reflection, the output light comprising both light scattered from the sample location and illuminating light reflected from the sample location, and direct the output light to the detector; and a spatial filter positioned to filter the output light, the spatial filter being arranged to pass output light but with a reduction in intensity that is greater within a predetermined numerical aperture than at larger numerical apertures.

Whereas the overall arrangement of the microscope may be similar to a conventional iSCAT microscope, there is additionally provided a spatial filter, which affects the output light. Specifically, the spatial filter passes the output light but with a reduction in intensity that is greater within a predetermined numerical aperture than at larger numerical apertures. As a result, the spatial filter selectively reduces the intensity of the illuminating light over scattered light, by taking advantage of the mismatch between the numerical aperture of reflected illuminating light and of light scattered from objects in a sample at the sample location. Thus, the spatial filter takes advantage of the different directionalities of these two sources of light. The reflected illuminating light will typically have a relatively small numerical aperture, whereas sub-diffraction-sized objects near a surface of the sample scatter light preferentially into high numerical apertures. Therefore, the reduction in intensity by the spatial filter at low numerical apertures predominantly affects the illuminating light and has a minimal effect on the scattered light, thereby maximising the imaging contrast.

This effect may be maximised by arranging the spatial filter so that the predetermined numerical aperture is identical or similar to the numerical aperture of the illuminating light reflected from the sample location.

The first aspect of the present invention relates to a microscope that operates in reflection. In that case, the illuminating light that reaches the detector is reflected predominantly from a surface of the sample, typically an interface between the sample and the sample holder, thereby providing interference with objects in the sample close to that surface. This provides an image with high contrast. This effect differs from a microscope operating in transmission wherein the illuminating light that reaches the detector is transmitted through the depth of the sample.

Operation in reflection has several advantages, which together allow high performance detection and quantification of weak scattering objects. Firstly, a relatively small amount, typically only 0.5%, of the illumination light is reflected at the commonly employed glass-water interface, while a significantly higher amount, typically greater than 90%, of light scattered by a nanoscopic object at the interface is scattered back towards the illumination direction. This intrinsically improves the ratio between scattered and reflected light fields more than 1000-fold compared to a transmission geometry resulting in a larger interferometric contrast. As a result, three orders of magnitude less photons need to be detected in the shot noise limited case to achieve the same nominal signal-to-noise given a specific scatterer, illumination intensity and exposure time. Secondly, in reflection, detection is much less sensitive to large scatterers present in solution as forward scattering and its interference with illumination light is not detected leading to higher background rejection.

These factors enhance the image quality and thereby enable high contrast detection of weakly scattering objects. Weak scattering objects reflect little of the illumination light.

These advantages apply particularly for imaging of objects that scatter light so weakly that accurate and precise imaging with other techniques is impossible. For example, the present invention is particularly suited to objects having a mass of 5000 kDa or less.

Similarly, the present invention may be applied with advantage to a sample comprising objects having a scattering cross section with respect to the illuminating light of $10^{-17}$ m$^2$ or less. Typically such objects may also have a scattering cross section with respect to the illuminating light of $10^{-26}$ m$^2$ or more, i.e. within a range from $10^{-17}$ m$^2$ from $10^{-26}$ m$^2$. Examples of objects that may be studied include proteins or small aggregates thereof.

In order to image objects that are very weak scatterers, the spatial filter is arranged to pass output light with a reduction in intensity within the predetermined numerical aperture to $10^{-2}$ of the incident intensity or less. Typically, the spatial filter may be arranged to pass output light with a reduction in intensity within the predetermined numerical aperture to $10^{-4}$ of the incident intensity or more, for example in the range from $10^{-2}$ to $10^{-4}$ of the incident intensity. Thus, in order to detect these weakly scattering objects a particular aperture may be used.

The illuminating light may be spatially and temporally coherent, for example using a laser as the light source. Widefield illumination in a microscope is commonly achieved by focussing a collimated laser beam into the back focal plane of the imaging objective, implying that it can be efficiently coupled in and out of the microscope while minimally affecting the overall imaging performance.

The microscope may be an existing commercial microscope, which is adapted by incorporating the spatial filter. Such adaptation can be performed very cheaply and simply, in contrast to existing iSCAT microscopes, which have complex and expensive optical and electronic setups in order to provide the required sensitivity, for example including requirements for an optical table, or expensive and complex optics, electronics and expert operation, which requirements are significantly reduced or avoided altogether by incorporating a spatial filter into an existing commercial microscope. That allows the present invention to be implemented in an extremely cost-effective manner. For example, larger fields of view may be provided without complex scanning arrangements and the use of low cost imaging cameras is enabled without loss of imaging performance or sensitivity.

According to a second aspect of the present invention, there is provided a spatial filter for filtering output light of an interferometric scattering microscope, the spatial filter having a similar function to that of the first aspect.

According to a third aspect of the present invention, there is provided a method of adapting an interferometric scattering microscope by performing spatial filtering of output light, the spatial filtering being similar to that performed in the first aspect.

According to a fourth aspect of the present invention, there is provided a method of quantifying the mass of an object, wherein the mass of said object is quantified by interferometric light scattering, and wherein said mass is quantified with up to 5% mass error. According to a fifth aspect of the present invention, there is provided a method of measuring or quantifying a change in the mass of an object, wherein the mass of said object is measured or quantified by interferometric light scattering.

To allow better understanding, embodiments of the present invention will now be described by way of non-limitative example with reference to the accompanying drawings, in which.

Figure 6:
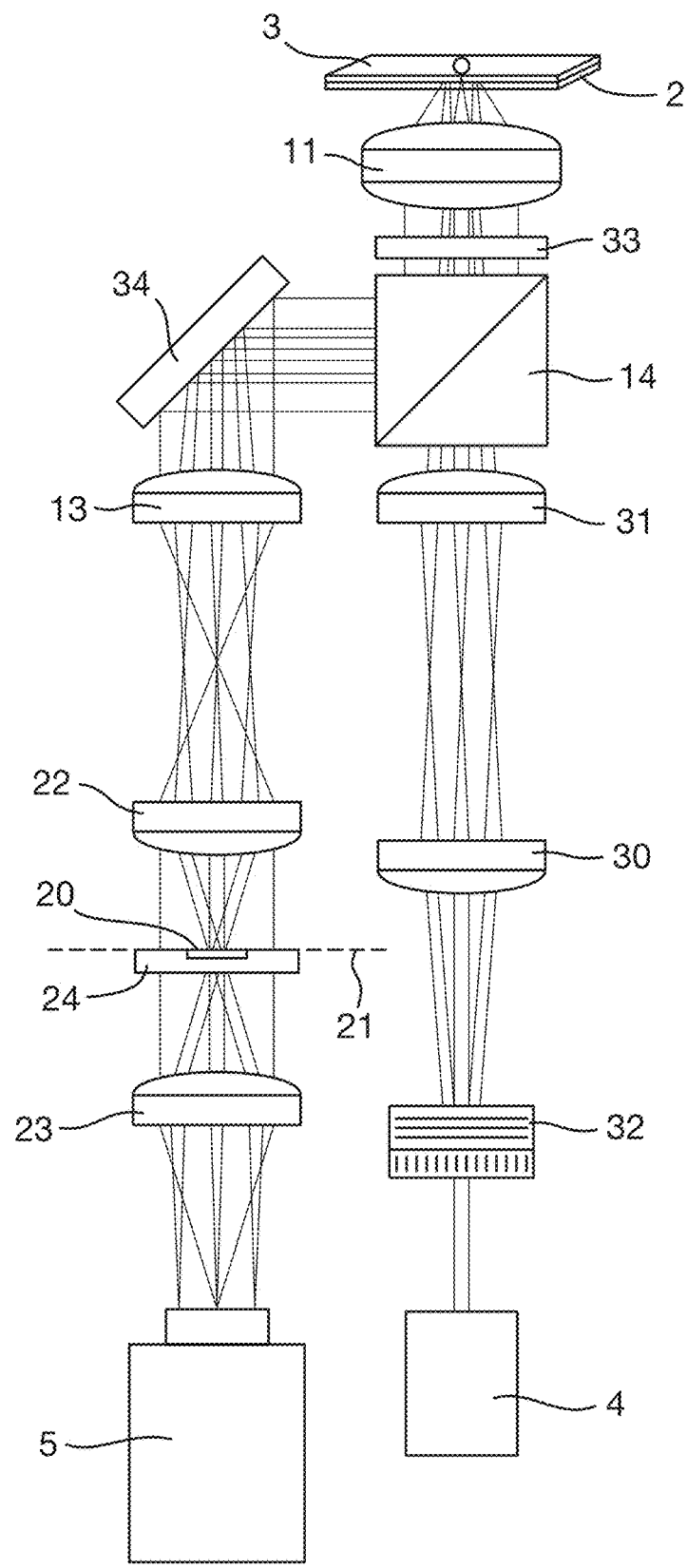
Figure 7:
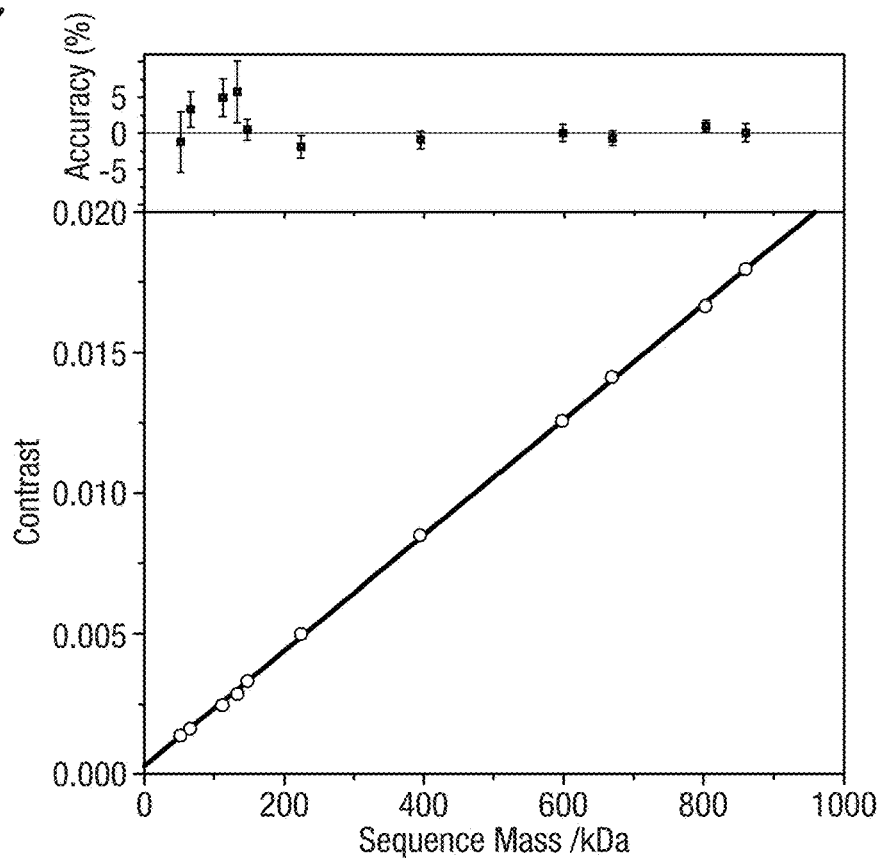
Figure 8:
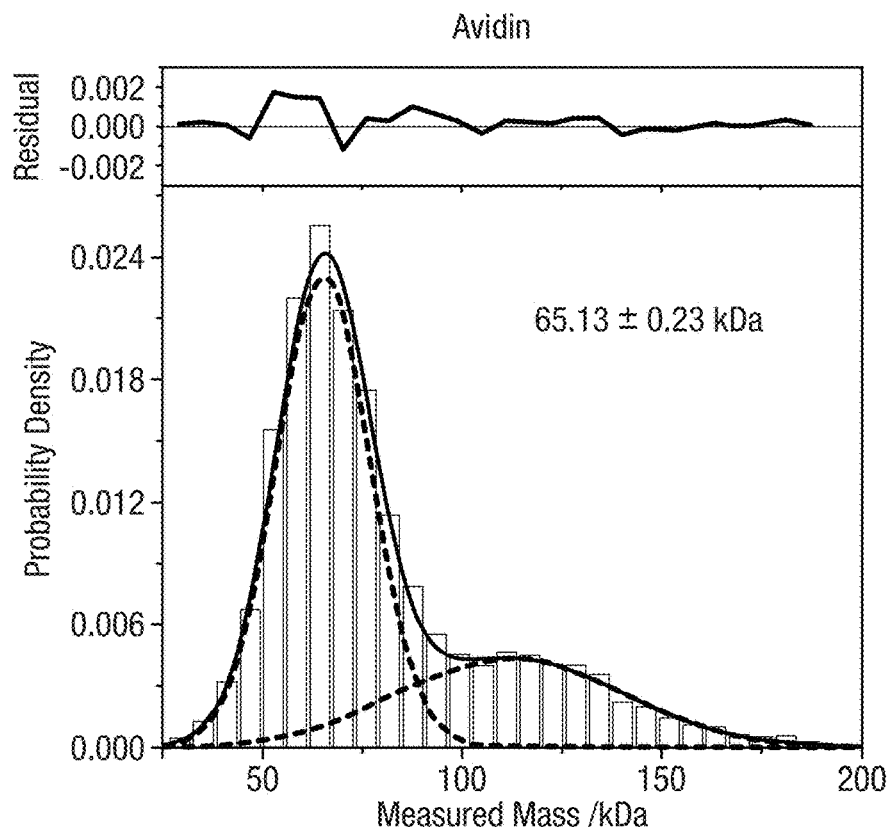
Figure 9:
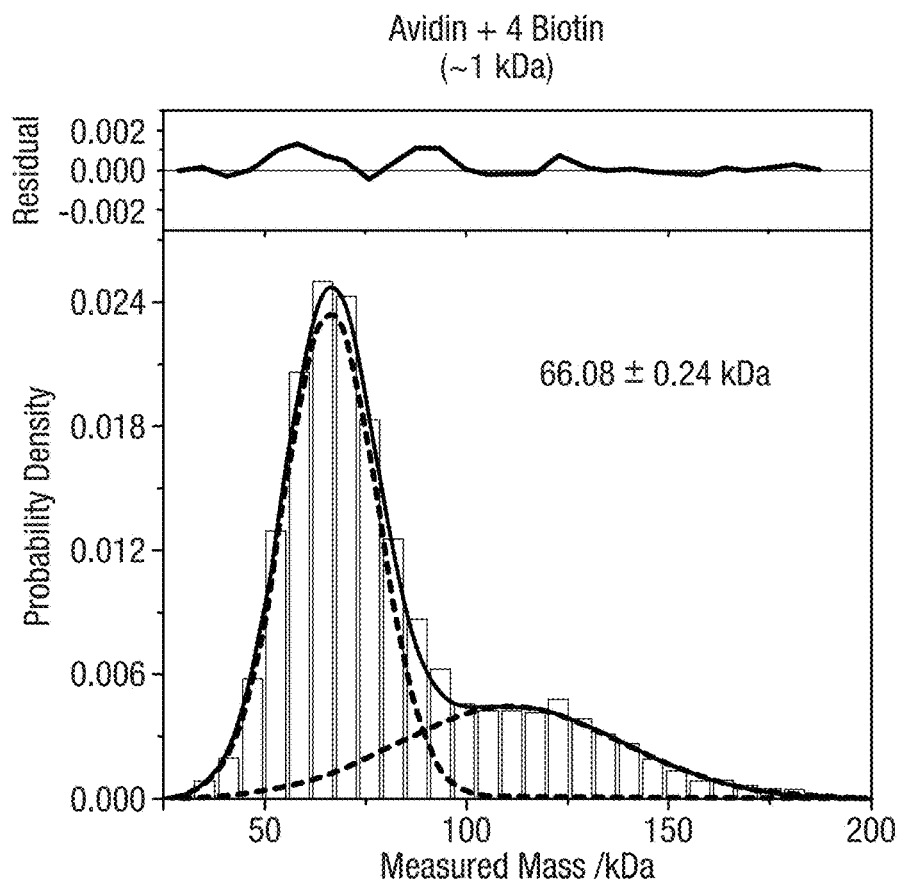
Figure 10:
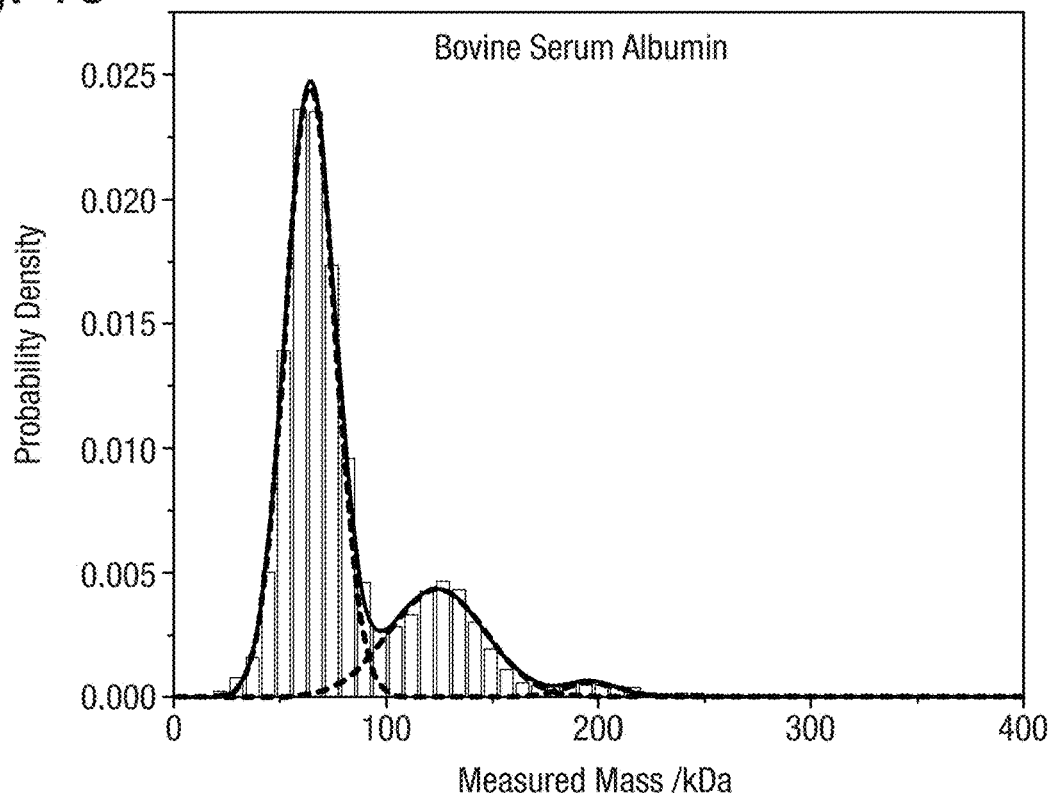

FIGS. 3, 4, 5, and 6 are schematic diagrams of modified iSCAT microscopes;

FIG. 7 is a plot of scattering contrast against sequence molecular weight for a series of proteins derived using the microscope shown in FIG. 6;

FIGS. 8 and 9 are mass histograms for avidin in the absence and presence of biotin, respectively, derived using the microscope shown in FIG. 6; and FIG. 10 is a mass histogram for bovine serum albumin derived using the microscope shown in FIG. 6.

FIGS. 11A-D illustrate the concept of interferometric scattering mass spectrometry (interferometric light scattering (iSCAMS)). (A) Schematic of the experimental approach relying on immobilization of individual molecules near a refractive index interface. Oligomeric states are coloured differently for clarity. (B) Differential interferometric scattering image of BSA. Scale bar: 0.5 µm. (C) Representative images of monomers, dimers, trimers and tetramers of BSA. Scale bar: 200 nm. (D) Scatter plot of single molecule binding events and their scattering contrasts for 12 nM BSA from 14 movies (lower). Corresponding histogram (N=12209) and zoom of the region for larger species (upper). The reduction in landing rate results from a drop in BSA concentration with time due to the large surface-to-volume ratio of our sample cell.

FIGS. 12A-D illustrate characterization of interferometric light scattering (iSCAMS) accuracy, precision, and dependence on molecular shape and identity. (A) Contrast vs molecular mass including proteins used for mass calibration (black), characterization of shape dependence (yellow), protein-ligand binding (green), lipid nanodisc composition (red) and glycosylation (blue). Mass error (upper panel) is given as a percentage of the sequence mass relative to the given linear fit. (B) Nanodisc mass-measurement for different lipid compositions and protein belts. Masses obtained by alternative methodologies for MSP1D1/DMPC are marked and extrapolated to the other compositions. The horizontal bars indicate the expected mass range as a function of characterization technique, with the thin bar indicating the contrast measured, and the thick bar representative of the measurement uncertainty in terms of the standard error of the mean for repeated experiments. For each sample, the upper text denotes the membrane scaffold protein (MSP) used, and the lower the lipids in the nanodisc. (C) Recorded differential contrast for Env expressed in the presence or absence of kifunensine, and associated mass ranges expected for different glycosylation levels. (D) Mass-sensitive detection of ligand binding using the biotin-streptavidin system according to the sequence mass of streptavidin and the masses of biotin and two biotinylated peptides relative to the calibration obtained from A. Abbreviations used are summarized in Supplementary Table S8.

FIGS. 13A and B illustrate single molecule mass analysis of heterogeneous protein assembly. (A) Mass distributions for Env in the presence of 0.5-40 nM BanLec monomer. Inset: zoom alongside expected positions for multiples of bound BanLec tetramers. (B) Oligomeric fractions colored according to A vs BanLec concentration including predictions (solid) using the given cooperative model.

FIGS. 14A-E illustrate mass-imaging of mesoscopic dynamics. (A) Schematic of and interferometric light scattering (e.g. iSCAMS) images for α-synuclein (1 µM) aggregation on a negatively charged bilayer membrane. (B) Initial growth rate vs. α-synuclein concentration alongside the best fit assuming first order kinetics (solid). Inset: Individual growth trajectories (grey) and average (black) for 21 particles from A. (C) Schematic and interferometric light scattering (e.g. iSCAMS) images of actin polymerization. The arrow highlights a growing filament. (D) Representative traces of actin filament tip position (grey) and corresponding detected steps (black). (E) Step and mass histogram from 1523 steps and 33 filaments including a fit to a Gaussian mixture model (black) and individual contributions (colored). Scale bars: 1 µm. In these experiments, background correction involved removal of the static background prior to acquisition, rather than continuous differential imaging).

FIG. 15 shows one-dimensional distributions of refractive index (top, bottom) and specific volume (left, right) for all proteins in six genomes, as calculated from the amino acid sequences, and the two-dimensional distribution of both quantities (middle). The top, right, and middle panels show the combined data from all genomes. The left and bottom panels show the respective distributions for the separate genomes, renormalized to have identical areas.

FIGS. 16A-D illustrate data analysis. (A) Raw camera images before and after the landing event in B-D showing image contrast due to coverslip roughness. (B) Illustration of the image averaging and differential imaging approach. The asterisk marks a landing event. Individual images are averaged into two consecutive blocks (blue and red), which are normalized and divided to provide differential contrast. The mid-point is scanned in time, meaning that the signal from stochastic landing events grows and fades, as indicated by the black arrow. Scale bars: 1 µm. (C) Corresponding cross-sections for the particle highlighted in B. (D) Corresponding signal magnitudes extracted by a fit to the PSF and fit (black).

Figure 1:
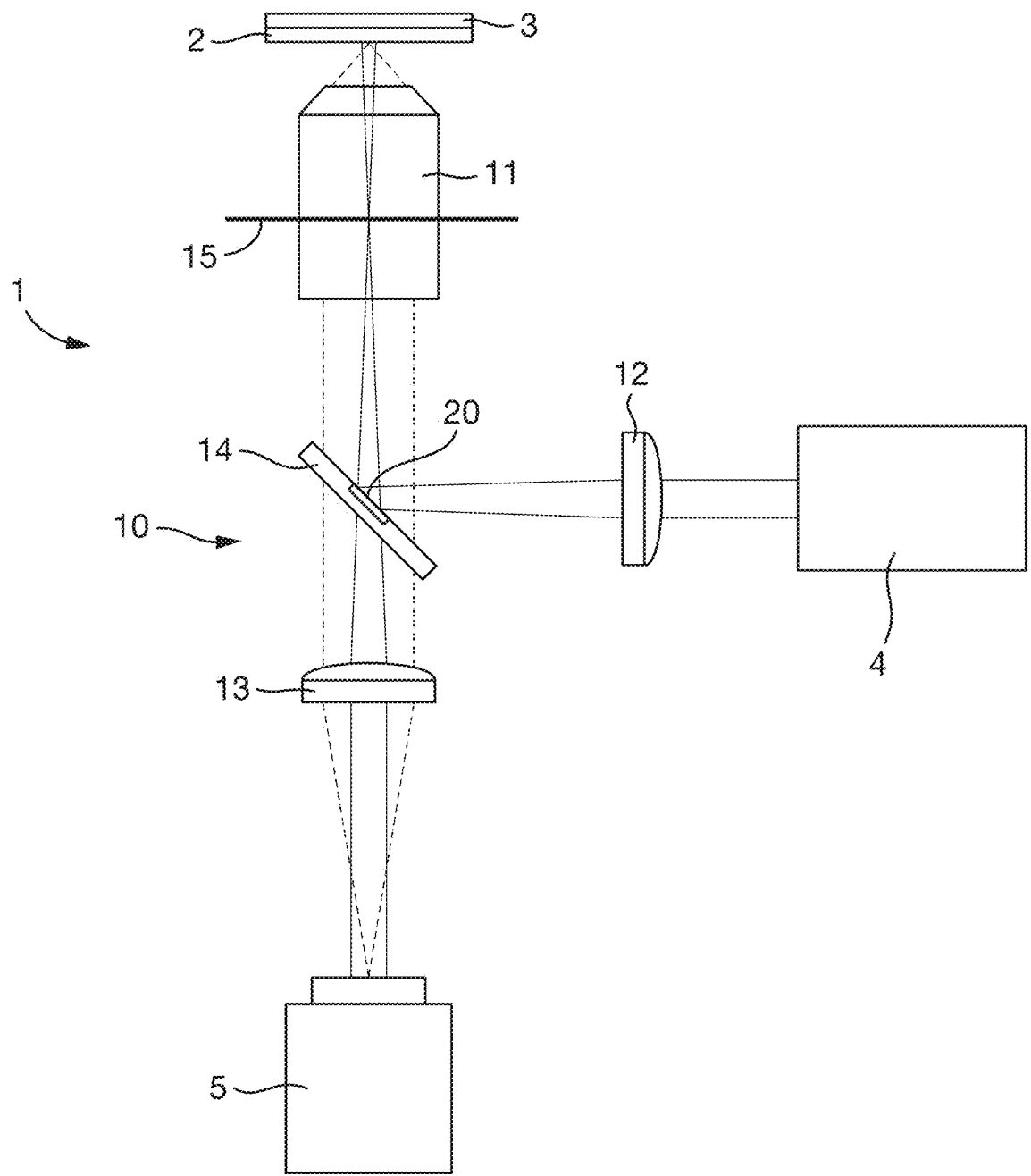
FIG. 1 is a schematic diagram of an iSCAT microscope.

FIGS. 17A-F show solution vs surface mass distributions. (A) Changes in binding time distributions for BSA monomers and dimers from the same data as shown in FIG. 1 and corresponding exponential fits. (B) Resulting binding rate constants for 11 different movies. (C) Binding constants for a variety of proteins exhibiting more than one oligomeric state studied in this work, normalized to the average binding constant for each protein. (D) Plot of binding constant vs (molecular weight)$^{-1/3}$, except for those exhibiting inverted behaviour but including protein samples exhibiting only a single oligomeric state as well as those in C, together with a linear fit describing the behavior expected from diffusion scaling. (E) BSA mass distribution before (solid bars) and after (red line) scaling for mass-dependent diffusion. (F) Env-BanLec oligomeric evolution before (solid) and after (dashed) correction for surface effects.

FIGS. 18A-E show kernel densities for FIG. 11 (A) Calibration proteins: GroEL 14mer (802.6 kDa), thyroglobulin (669 kDa), non-muscle myosin 2b (597 kDa), HSP16.5 24mer (394.8 kDa), β-amylase (224.3 kDa) showing some dissociation at the low concentrations at which we measured, alcohol dehydrogenase (147.4 kDa), BSA (66.4 kDa), streptavidin (52.8 kDa). (B) Smooth-muscle myosin. (C) Biotin-streptavidin. (D) Lipid nanodiscs. (E) Env expressed in the presence and absence of kifunensine. The Kernel bandwidths were 3, 5, 5, 7.5, 10, 10, 12 and 15 kDa with increasing mass for A; 9 kDa for B; 3 kDa for C; 5 kDa for D; 10 kDa for E.

FIGS. 19A-C show noise, resolution and shape-dependence characterization. (A) Absolute and fractional mass residuals as a function of molecular shape factor(48). (B) Standard deviation of differential images as a function of integration time, for acquisition at 1000 frames/s. The dashed line indicates the nominal noise floor, and the solid line expectation based on shot noise. (C) Standard deviation of contrast histograms obtained for the 8 calibration proteins from FIG. 11A, including a linear fit as a guide to the eye.

FIG. 20 shows EM images of SMM in the extended (6S, left) and folded (10S, middle) conformation. Cross-linking at 25 mM salt increased the fraction of SMM dimers (right). Scale bar: 50 nm.

FIG. 21 shows high-performance liquid chromatography of N-glycans released from Env expressed in the absence (top) and presence (bottom) of kifunensine. The corresponding average masses are determined to be 1664 and 1885 Da, respectively, based on peak height.

FIGS. 22A-22B show initial growth rate distributions, and thioflavin-T staining for α-synuclein aggregation. (A) Growth rate histograms underpinning FIG. 4B from the main text. Total number of particles analyzed: 31, 20, 58, 46, 40, 30. (B) Fluorescence image after thioflavin-T staining of a bilayer aggregation assay at 10 µM after overnight incubation. Scale bar: 5 µm.

FIGS. 23A-H show addition of actin to individual filaments. (A) Representative 1.7×1.7 µm$^2$ images of short phalloidin-stabilized actin filaments. (B) Scatter plot of detected steps at the two ends of the filament for the filaments from A. (C) Macroscopic growth rate recorded for 26, 14, 37 and 10 different filaments at increasing actin concentration including a linear fit. (D) Step size histograms resulting from applying the step-finding algorithm to simulated step traces with different step sizes. In each case, 16 filaments were simulated with a total number of 1500 steps. The total number of detected steps were 22, 301, 575, 704, 940, 1088 and 1247 for 0-8 nm steps. (E) Experimental step size distributions as a function of minimum delay time between steps including fits to a Gaussian mixture model. (F) Step sizes determined from E. (G) Representative images of the growing filament (left) and differential mass image (right) for 2.8, 5.6 and 8.4 nm steps. The points indicate the centre of the differential mass and are overlaid on the image of the filament tip. Scale bar: 200 nm. (H) Mass corresponding to 1, 2 and 3 subunit additions obtained from images such as those shown in G, using 11, 14 and 8 events, respectively. The line indicates a linear fit to 0, 1 and 2 subunit additions to obtain a step size-to-mass conversion.

In the microscopes and methods described herein, the light used may be: ultraviolet light (which may be defined herein as having wavelengths in the range from 10 nm to 380 nm); visible light (which may be defined herein as having wavelengths in the range from 380 nm to 740 nm); infrared light (which may be defined herein as having wavelengths in the range from 740 nm to 300 µm). The light may be a mixture of wavelengths. Herein, the terms 'optical' and 'optics' are used to refer generally to the light to which the methods are applied.

FIG. 1 illustrates an iSCAT microscope 1 which is arranged as follows.

The microscope 1 includes the following components that, except for the spatial filter described in more detail below, have a construction that is conventional in the field of microscopy.

The microscope 1 comprises a sample holder 2 for holding a sample 3 at a sample location. The sample 3 may be a liquid sample comprising objects to be imaged, which are described in more detail below. The sample holder 2 may take any form suitable for holding the sample 3. Typically, the sample holder 2 holds the sample 3 on a surface, which forms an interface between the sample holder 2 and the sample 3. For example, the sample holder 2 may be a coverslip and/or may be made from glass. The sample 3 may be provided on the sample holder 2 in a straightforward manner, for example using a micropipette.

The microscope 1 further comprises an illumination source 4 and a detector 5.

The illumination source 4 is arranged to provide illuminating light. The illuminating light may be coherent light. For example, the illumination source 4 may be a laser. The wavelength of the illuminating light may be selected in dependence on the nature of the sample 3 and/or the properties to be examined. In one example, the illuminating light has a wavelength of 405 nm.

Optionally, the illumination light may be modulated spatially, to remove speckle patterns that arise from the coherent nature of the illumination and laser noise, for example as detailed in Kukura et al., "High-speed nanoscopic tracking of the position and orientation of a single virus", Nature Methods 2009 6:923-935.

The detector 5 receives output light in reflection from the sample location. Typically, the microscope 1 may operate in a wide-field mode, in which case the detector 5 may be an image sensor that captures an image of the sample 3. The microscope 1 may alternatively operate in a confocal mode, in which case the detector 5 may be an image sensor or may be a point-like detector, such as a photo-diode, in which case a scanning arrangement may be used to scan a region of the sample 3 to build up an image. Examples of image sensors that may be employed as the detector 5 include a CMOS (complementary metal-oxide semiconductor) image sensor or a CCD (charge-coupled device).

The microscope 1 further comprises an optical system 10 arranged between the sample holder 2, the illumination source 4 and the detector 5. The optical system 10 is arranged as follows to direct illuminating light onto the sample location for illuminating the sample 3, and to collect output light in reflection from the sample location and to direct the output light to the detector 5.

The optical system 10 includes an objective lens 11 which is a lens system disposed in front of the sample holder 2. The optical system 10 also includes a condenser lens 12 and a tube lens 13.

The condenser lens 12 condenses illuminating light from the light source 11 (shown by continuous lines in FIG. 1) through the objective lens 11 onto the sample 3 at the sample location.

The objective lens 11 collects the output light which comprises both (a) illuminating light reflected from the sample location (shown by continuous lines in FIG. 1), and (b) light scattered from the sample 3 at the sample location (shown by dotted lines in FIG. 1). The reflected light is predominantly reflected from the interface between the sample holder 2 and the sample 3. Typically, this is a relatively weak reflection, for example a glass-water reflection. For example, the intensity of the reflected illuminating light may be of the order of 0.5% of the intensity of the incident illuminating light. The scattered light is scattered by objects in the sample 3.

In a similar manner to conventional iSCAT, scattered light from objects at or close to the surface of the sample constructively interfere with the reflected light and so are visible in the image captured by the detector 5. This effect differs from a microscope operating in transmission wherein the illuminating light that reaches the detector is transmitted through the depth of the sample leading to a much smaller imaging contrast.

As shown in FIG. 1, the reflected illuminating light and the scattered light have different directionalities. In particular, the reflected illuminating light has a numerical aperture resulting from the geometry of the beam of light output by the light source 4 and the optical system 6. The scattered light is scattered over a large range of angles and so fills larger numerical aperture than the reflected illuminating light.

The tube lens 13 focuses the output light from the objective lens 11 onto the detector 5.

The optical system 6 also includes a beam splitter 14 that is arranged to split the optical paths for the illuminating light from the light source 4 and the output light directed to the detector 5. Except for the provision of a spatial filter as described below, the beam splitter 14 may have a conventional construction that provides partial reflection and partial transmission of light incident thereon. For example, the beam splitter 14 may be a plate, typically provided with a film, which may be metallic or dielectric, arranged at 45° to the optical paths. Alternatively, the beam splitter 14 may be a cube beam splitter formed by a matched pair of prisms having a partially reflective film at the interface between the prisms. Alternatively, the beam splitter 14 may be a polarising beam splitter, used in combination with a quarter wave plate between the beam splitter 14 and the sample 3.

In the example shown in FIG. 1, the light source 4 is offset from the optical path of the objective lens 11 so that the illuminating light from the light source 4 is reflected by the beam splitter 14 into the objective lens 11, and conversely the detector 5 is aligned with the optical path of the objective lens 11 so that the output light from the sample location is transmitted through the beam splitter 14 towards the detector 5.

In addition to the components described above that may be of a conventional construction, the microscope 1 includes a spatial filter 20. In the example shown in FIG. 1, the spatial filter 20 is formed on the beam splitter 14 and is thereby positioned behind the back aperture of the objective lens 11, and so directly behind the back focal plane 15 of the objective lens 11. Thus, the spatial filter 20 may be implemented without entering the objective lens as in phase contrast microscopy. Placing the spatial filter directly behind the entrance aperture of the objective rather than in a conjugate plane (for example as described below) has the distinct advantage of strongly suppressing back reflections originating from the numerous lenses within high numerical aperture microscope objectives. This, in turn, reduces imaging noise, lowers non-interferometric background and reduces the experimental complexity, number of optics and optical pathlength leading to increased stability of the optical setup and thus image quality.

However this location is not essential and a spatial filter having an equivalent function may be provided elsewhere as described below.

The spatial filter 20 is thereby positioned to filter the output light passing to the detector 5. In the example shown in FIG. 1 in which the detector 5 is aligned with the optical path of the objective lens 11, the spatial filter 20 is therefore transmissive.

The spatial filter 20 is partially transmissive and therefore passes the output light, which includes the reflected illumination light, but with a reduction in intensity. The spatial filter 20 is also aligned with the optical axis and has a predetermined aperture so that it provides a reduction in intensity within a predetermined numerical aperture. Herein, numerical aperture is defined in its normal manner as being a dimensionless quantity characterising a range of angles with respect to the sample location from which the output light originates. Specifically, the numerical aperture NA may be defined by the equation $NA = n \cdot \sin(\theta)$, where $\theta$ is the half angle of collection and n is the refractive index of the material through which the output light passes (for example the material of the components of the optical system 6).

The spatial filter 20 provides no intensity reduction outside the predetermined numerical aperture. In principle, the spatial filter 20 could alternatively provide a reduction in intensity outside its predetermined aperture, but a reduction in intensity that is less than the reduction in intensity within the predetermined numerical aperture, although this is less desirable.

The spatial filter 20 may be formed in any suitable manner, typically comprising a layer of deposited material. The material may be, for example, a metal such as silver. The deposition may be performed using any suitable technique.

As sub-diffraction sized objects near an interface scatter light preferentially into a larger numerical aperture than the reflected illuminating light, the reduction in intensity provided by the spatial filter 20 preferentially reduces the intensity in detection of the reflected illuminating light over the scattered light. Accordingly, the reduction in intensity by the spatial filter 20 at low numerical apertures predominantly affects the reflected illuminating light and has a minimal effect on the scattered light, thereby maximising the contrast in the capture image. The enhanced imaging contrast enables high contrast detection of objects that are weak scatterers.

The contrast enhancement may be understood as follows. As the spatial filter 20 passes part of the output light in the predetermined numerical aperture (i.e. is partially transmissive in this example), fractions of illuminating light and scattered light fields reach the detector and interfere for a sufficiently coherent illumination source. The light intensity reaching the detector $I_{det}$ is then given by $I_{det} = |E_{inc}|^2 \{r^2 t^2 + |s|^2 + 2rt|s|\cos\Phi\}$, where $E_{inc}$ is the incident light field, $r^2$ is the reflectivity of the interface and $t^2$ is the transmissivity of the spatial filter 20, s is the scattering amplitude of the object, and $\Phi$ is the phase difference between transmitted illuminating light and the scattered light. Thus, the scattering contrast is enhanced, albeit at the expense of the total number of detected photons.

Thus, contrast is provided in a similar manner to conventional iSCAT, but controlled additionally by the transmissivity of the spatial filter. This provides the ability to tune the amplitude of the reference field directly through selection of the transmissivity $t^2$ of the spatial filter 20 as opposed to being fixed by the reflectivity of a glass-water interface as in standard iSCAT. In the case that the spatial filter 20 is a layer of deposited material, the transmissivity $t^2$ may be selected by choice of the material and/or thickness of the layer. Such tuning may be performed according to, for example, the scattering object of interest, the camera full well capacity and magnification.

The interferometric light scattering microscope may include a sample holder that incorporates a solid immersion lens (SIL) as the final optical element. An Sit has higher magnification and higher numerical aperture than common lenses by filling the object space with a high-refractive-index solid material. It may be preferred to include a hemispherical SIL or a superhemispherical SIL. The SIL may be any suitable SIL, and has preferably been polished such that the roughness had been reduced to less than 10 nm. Alternatively, the SIL can be manufactured, for example by 3D printing, such that the roughness is less than 10 nm.

To maximise these beneficial effects to iSCAT, the predetermined numerical aperture may be the numerical aperture of the reflected illuminating light within the output light, but that is not essential. For example, benefits of a similar nature could be achieved if the predetermined numerical aperture was slightly smaller than, or larger than the numerical aperture of the reflected illuminating light.

Use of the spatial filter 20 does not fundamentally alter the sensitivity limits or SNR (signal to noise ratio) achievable for scattering by a given object, incident light intensity and exposure time. However, by improving the contrast and reducing the overall detected photon flux, it does, however, dramatically simplify the implementation of iSCAT to achieve a given sensitivity or SNR. Existing iSCAT microscopes have complex and expensive components, for example requiring an optical table, and expensive and complex optics, electronics, as well as needing expert operation. Such requirements are greatly relaxed by the use of the spatial filter 20. Equivalent performance to existing iSCAT microscopes may be achieved, for example, simply by adding the spatial filter 20 to an existing commercial microscope that does not have the complex and expensive components mentioned above. The spatial filter 20 itself is of course a simple and cheap component. In addition, the spatial filter 20 enables use of standard CMOS or CCD cameras with low full well capacity without loss of imaging sensitivity.

Thus, the microscope 1 may be an existing commercial microscope, which is adapted by incorporating the spatial filter 20. Such an adaptation can be performed very cheaply and simply. The adaption may be performed by forming the spatial filter in an adaptor arranged to be received in an accessory slot of an existing commercial microscope, for example in a similar manner to the adaptor disclosed in WO-2015/092778 that is used to incorporate a mirror into a microscope.

Alternatively, the microscope 1 may be designed specifically for use with the spatial filter 20.

Figure 2:
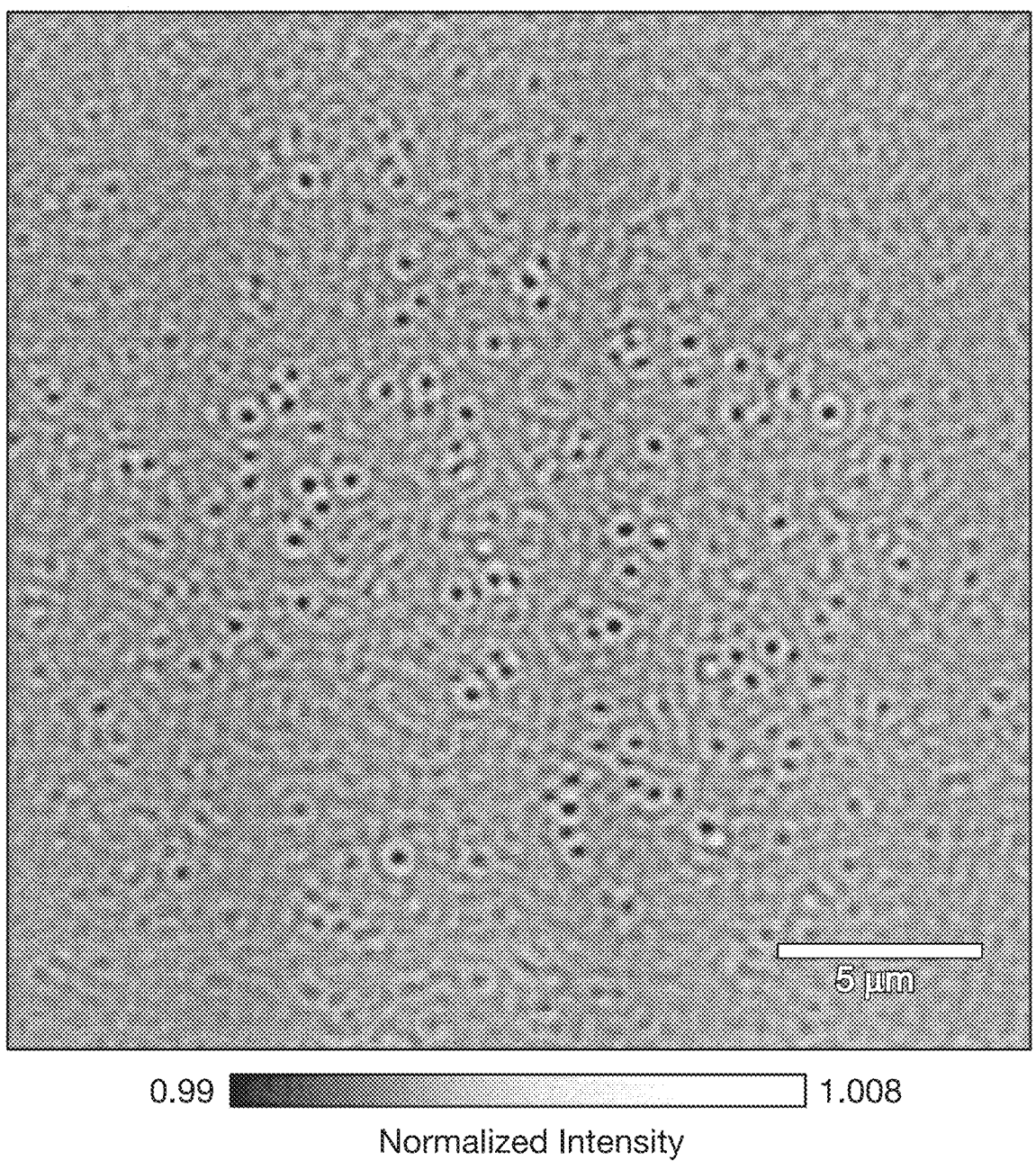
FIG. 2 is an image captured by the iSCAT microscope.

An image acquired using an example of the microscope 1 is shown in FIG. 2. In this example, coherent brightfield illuminating light was provided and the spatial filter 20 comprised by a layer of silver of thickness 180 nm deposited on fused silica with a 3.5 mm diameter so as to transmit $1\times10^{-2}$ of the reflected light intensity. This results in a scattering contrast of 1% for a single 395 kDa protein and a SNR of 10 (at an image capture rate of 10 frames s$^{-1}$, and with an intensity of illuminating light of 10 kW/cm$^2$). FIG. 2 is an image captured using a low cost CMOS camera as the detector 5. As can be seen, a high contrast image is achieved. Moreover, brightfield illumination ensures that the strongest unwanted back-reflections, usually originating from the objective are directed away from the detector 5, minimising imaging background and enabling large fields of view without complex scanning of the beam of illuminating light.

The advantages of enhanced contrast allow imaging of objects that scatter light so weakly that imaging with other techniques is difficult. For example, the present invention may be applied with advantage to a sample comprising objects having a mass of 5000 kDa or less. Typically, the present invention may be applied to a sample comprising objects having a mass of 10 kDa or more, for example objects having a mass within a range from 10 kDa to 5000 kDa.

Alternatively or as well, the present invention may be applied to a sample comprising objects having a scattering cross section with respect to the illuminating light of $10^{-12}$ m$^2$ or less, or more preferably $10^{-17}$ m$^2$ or less. Typically such objects may also have a scattering cross section with respect to the illuminating light. Typically such objects may also have a scattering cross section with respect to the illuminating light of $10^{-20}$ m$^2$, or more preferably $10^{-26}$ m$^2$ or more, for example within a range from $10^{-17}$ m$^2$ from $10^{-26}$ m$^2$. Scattering cross section is a fundamental, measurable property relating to the effective size of an object to incident light of a particular wavelength, independent of the technique used to measure it. Scattering cross sections can be, for example, measured by dark field microscopy.

Examples of objects to which the present invention may be applied include proteins or small aggregates thereof, or their binding partners.

In order to image objects that are relatively weak scatterers, the spatial filter 20 may be arranged to pass reflected illuminating light with a reduction in intensity within the predetermined numerical aperture to an intensity in the range from $10^{-2}$ to $10^{-4}$ of the incident intensity (in this context, the intensity of the output light that is incident on the spatial filter 20).

Otherwise, the microscope 1 may be designed and operated without reference to the spatial filter 20. For example, the field of view is adjustable by changing the focusing conditions of the illumination light. Similarly, multi-colour imaging requires no more than coupling additional laser sources into a single mode fibre, if such a fibre is used to deliver the illumination light. In general terms, the microscope 1 may be adapted to use other components and techniques known for iSCAT, for example as disclosed in Kukura et al., "High-speed nanoscopic tracking of the position and orientation of a single virus", Nature Methods 2009 6:923-935, and in Ortega-Arroyo et al. "Interferometric scattering microscopy (iSCAT): new frontiers in ultrafast and ultrasensitive optical microscopy", Physical Chemistry Chemical Physics 2012 14:15625-15636.

Some examples of specific modifications that may be made to microscope 1 will now be described with reference to FIGS. 3 to 5, although these examples are without limitation. Apart from the modifications described below, the microscope 1 has the same construction and operation as described above. For brevity, common components are given the same reference numerals, and the above description thereof is not repeated.

Figure 3:
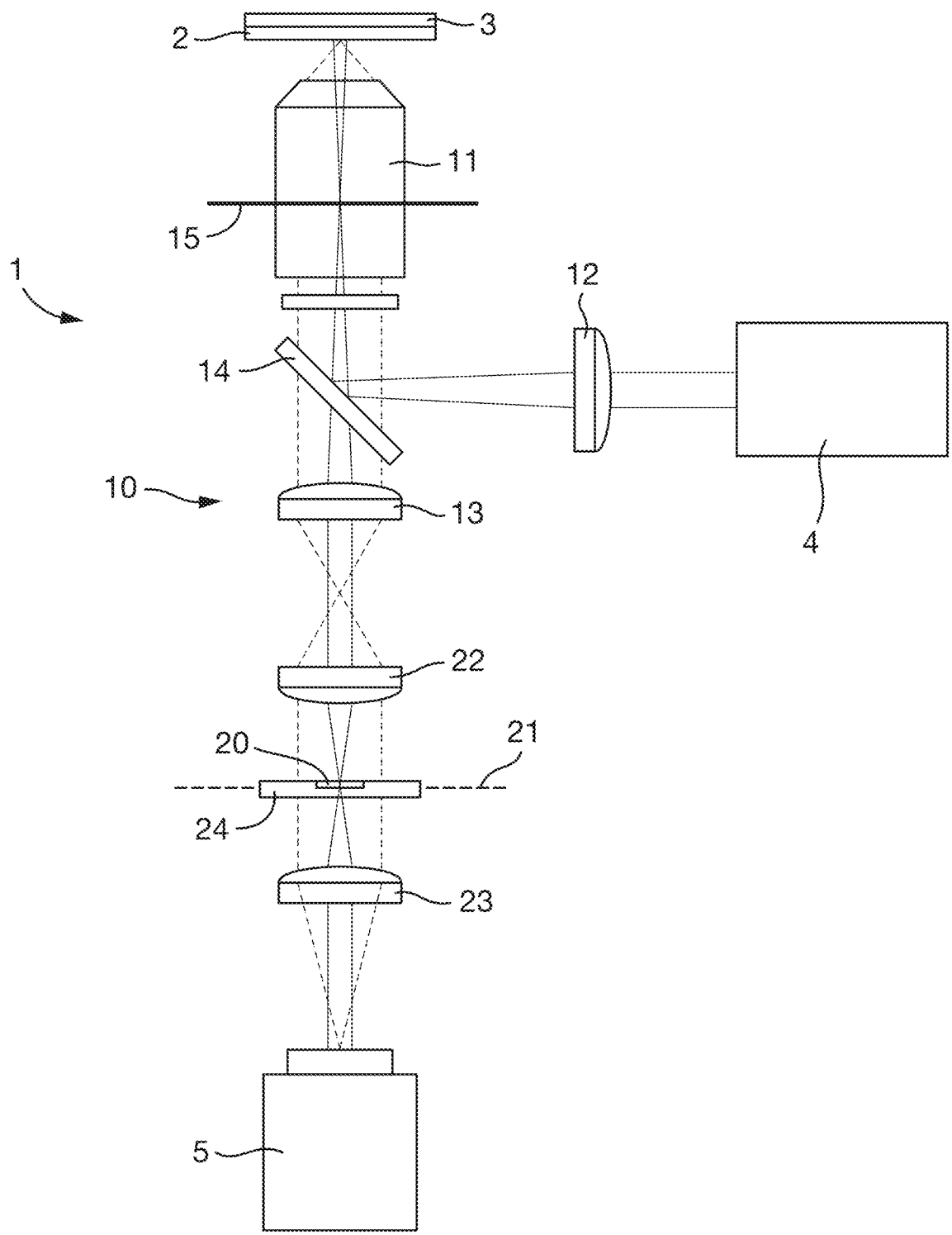

FIG. 3 illustrates the microscope 1 with a modification to position the spatial filter 20 at a conjugate focal plane 21 of the back focal plane 15 of the objective lens 11, instead of being behind the back aperture of the objective lens 11. The conjugate focal plane 21 of the back focal plane 15 of the objective lens 11 is formed between a pair of telescope lenses 22 and 23 positioned behind the tube lens 13. The first telescope lens 22 in the optical path images the back focal plane 15 of the objective lens 11 to form the conjugate focal plane 21 and the second telescope lens 23 images the conjugate focal plane 21 onto the detector 5.

The spatial filter 20 is provided at the conjugate focal plane 21 and is formed on a transparent plate 24. The configuration and operation of the spatial filter 20 are the same as described above with reference to FIG. 1, for example being aligned with the optical axis and having a predetermined aperture so that it provides reduction in intensity within the same, predetermined numerical aperture as described above (although the spatial filter 20 is now nearly perpendicular to the optical path, rather than at 45° to the optical path).

Figure 4:
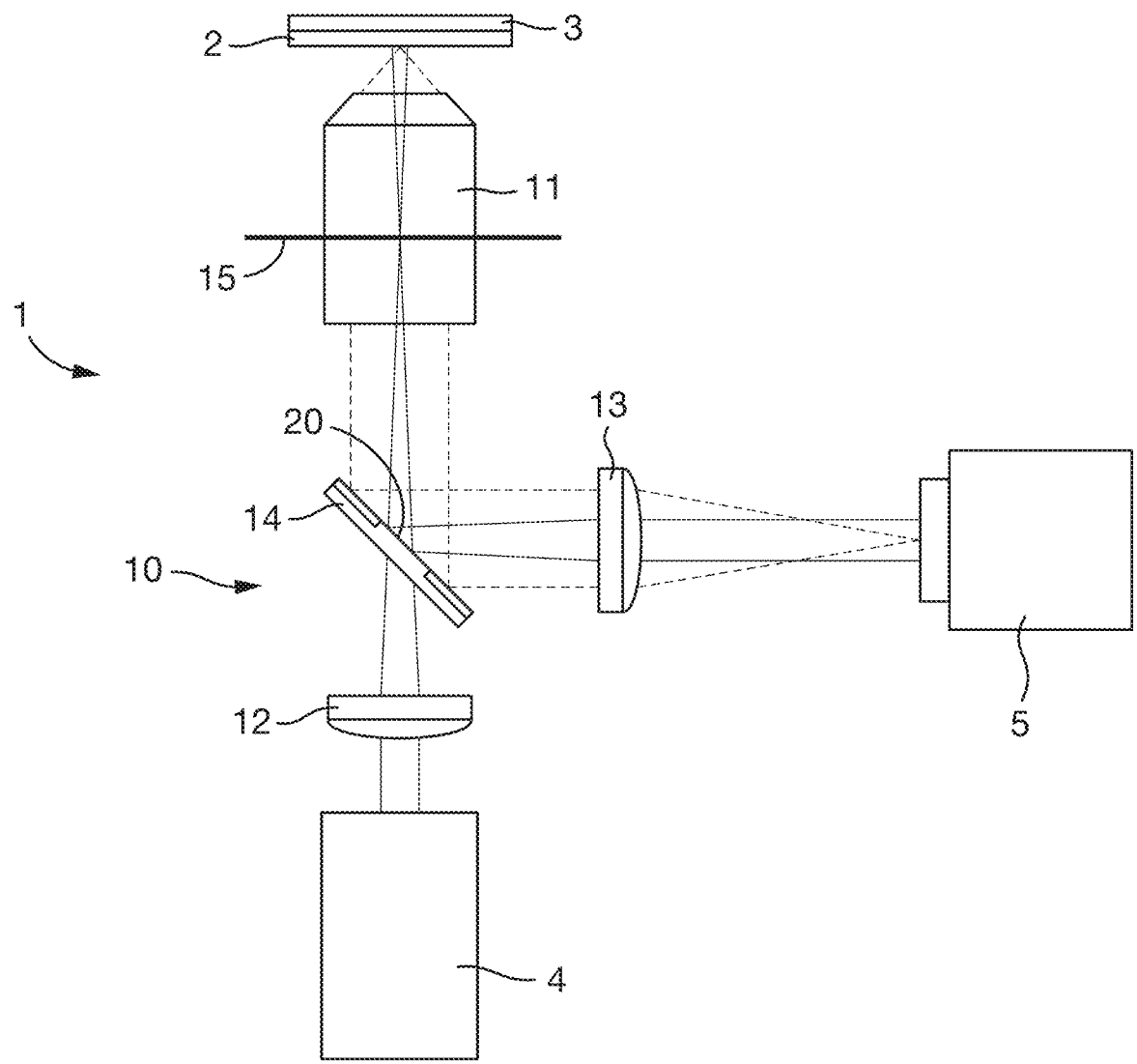

FIG. 4 illustrates the microscope 1 with a modification in which the spatial filter 20 is reflective, instead of being transmissive. In this modification, the positions of the light source 4 and the detector 5 are reversed so that the illuminating light from the light source 4 is transmitted through the beam splitter 14 into the objective lens 11, and conversely the output light from the sample location is reflected by the beam splitter 14 towards the detector 5.

The spatial filter 20 is formed on the beam splitter 14, but in view of the reversal of the light source 4 and the detector 5, the spatial filter 20 is reflective. Despite being reflective, the spatial filter 20 is arranged to operate in the same manner as described above. That is, the spatial filter 20 filters the output light passing to the detector 5 passes the output light but with reduction in intensity. Although achieved in this case by being partially reflective, the configuration and operation of the spatial filter 20 is otherwise the same, for example being aligned with the optical axis and having a predetermined aperture so that it provides reduction in intensity within a predetermined numerical aperture, as described above.

Figure 5:
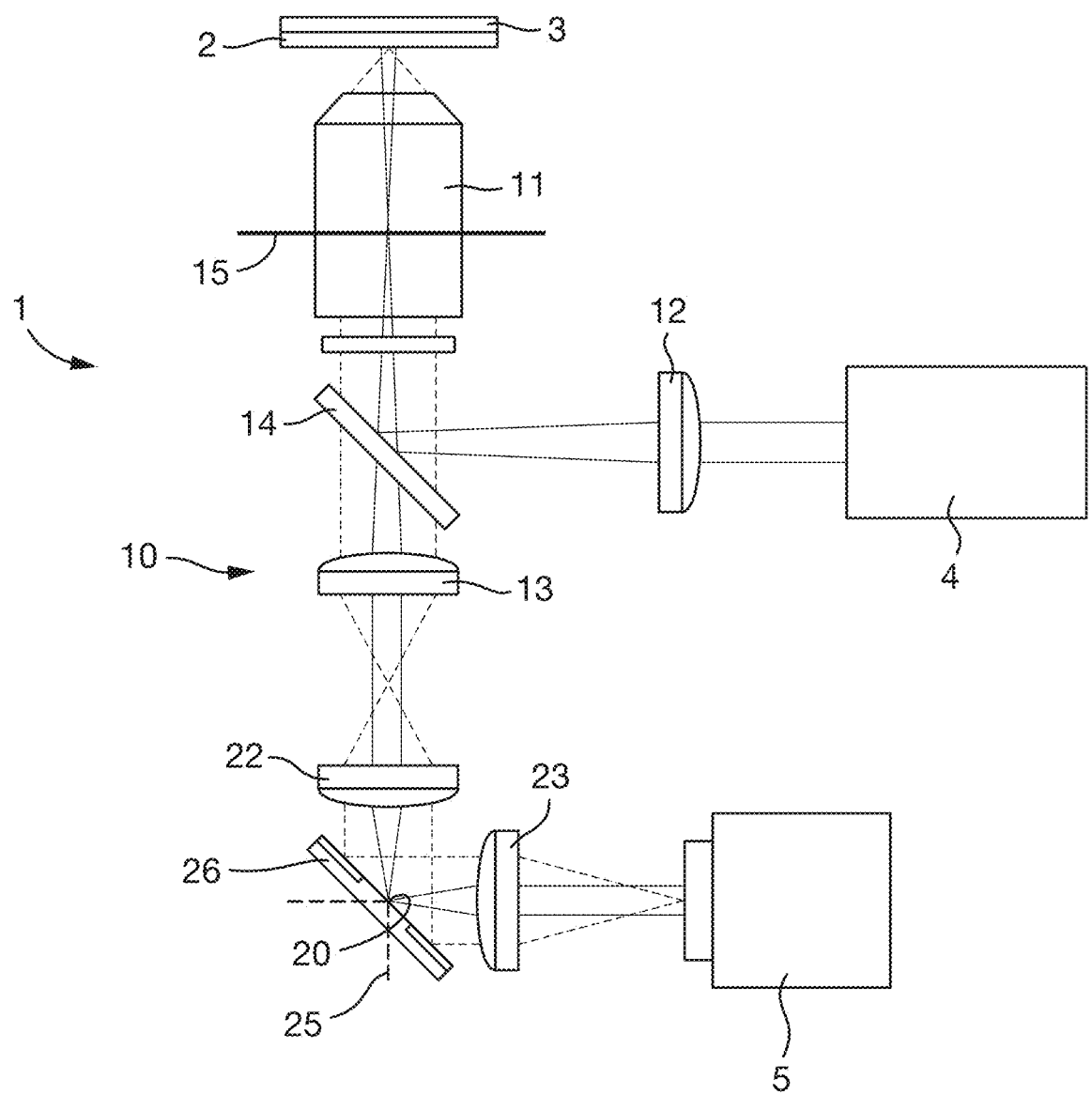

FIG. 5 illustrates the microscope 1 with a modification similar to that of FIG. 3 to position the spatial filter 20 at a conjugate focal plane 25 of the back focal plane 15 of the objective lens 11, instead of being behind the back aperture of the objective lens 11, and with a further modification in which the spatial filter 20 is reflective, instead of being transmissive. The conjugate focal plane 25 of the back focal plane 15 of the objective lens 11 is formed between a pair of telescope lenses 22 and 23 positioned behind the tube lens 13, in the same manner as in the modification of FIG. 3. However, a reflective plate 26 is provided between the telescope lenses 22 and 23 at the conjugate focal plane 25 but arranged at 45° to deflect the optical path so that the reflection at the reflective plate 26 diverts the optical path by 90°. The spatial filter 20 is provided at the conjugate focal plane 25 by being formed on the reflective plate 26, and so is reflective instead of transmissive. Despite being reflective, the spatial filter 20 is arranged to operate in the same manner as described above, that is in a similar manner to the modification of FIG. 4.

FIG. 6 illustrates the microscope 1 with a modification to position the spatial filter 20 at a conjugate focal plane 21 of the back focal plane of the objective lens 11, instead of being behind the back aperture of the objective lens 11. The conjugate focal plane 21 of the back focal plane 15 of the objective lens 11 is formed between a pair of telescope lenses 22 and 23 positioned behind the tube lens 13, in the same manner as in the modification of FIG. 3. However, compared to the modification of FIG. 3, the following further modifications are also made, noting that each of the modifications in FIG. 6 could be applied independently of each other.

An acousto-optical deflector 32 is arranged after the light source 4 to provide scanning of the illuminating light. The acousto-optical deflector 32 may be operated to scan a region of the sample 3 to build up an image and/or to provide spatial modulation for removing speckle patterns that arise from the coherent nature of the illumination and laser noise, as mentioned above.

The condenser lens 12 is replaced by a pair of telecentric lenses 30 and 31 that perform the function of imaging any modifications to the beam path at the acousto-optical deflector 32 into the back focal plane of the imaging objective.

The positions of the light source 4 and the detector 5 are reversed in a similar manner to the modification of FIG. 4, so that the illuminating light from the light source 4 is transmitted through the beam splitter 14 into the objective lens 11, and conversely the output light from the sample location is reflected by the beam splitter 14 towards the detector 5.

The beam splitter 14 is a polarising beam splitter and a quarter wave plate 33 is arranged between the beam splitter 14 and the sample 3, so that the beam splitter 14 splits the light.

A mirror 34 is arranged to deflect the output light reflected by the beam splitter 14. This is merely to provide for a more compact arrangement of the microscope 1.

The microscope 1 may be used to perform iSCAT for a wide range of applications including single molecule detection. In general, the contrast enhancement is beneficial and may be applied to all imaging of sub-diffraction and weakly scattering objects. A particular application is label-free imaging of weak scatterers, where objects of interest have to be invariably detected on top of a large background, which reduces the imaging contrast. The microscope 1 may be used for a wide range of studies and measurements, for example to measure any changes in refractive index, which includes, for example: single molecule binding/unbinding, phase transitions, clustering, assembly/disassembly, aggregation, protein/protein interactions, protein/small molecule interactions, high-sensitivity label-free imaging.

Thus, there are numerous applications for the microscope 1, ranging from fundamental research to industrial applications, for example in the pharmaceutical industry. In particular, it opens up iSCAT to fields precluded by the complex experimental setups currently needed to perform iSCAT. As an example, iSCAT is currently the world's most sensitive label-free single molecule imaging biosensor, which could have significant impact for example on the surface plasmon resonance sensing market. In addition, it functions as an accurate, precise and highly resolved single molecule mass spectrometer in solution, with many applications in research and industry.

EXAMPLES

Important performance parameters of accuracy, resolution and precision have been quantified using a series of protein samples in a microscope having the configuration shown in FIG. 6, as follows.

Quantification of the instrumental accuracy in determining molecular weight was performed by recording the scattering contrasts of a series of proteins dissolved at 10 nM concentration in standard PBS buffer (the proteins being Streptavidin—53 kDa, Bovine Serum Albumin—66 kDa, Alcohol Dehydrogenase—~146 kDa, β-Amylase—224 kDa, HSP 16.5-395 kDa, non-muscle myosin IIb modified with a HALO tag—598 kDa, Thyroglobulin—669 kDa, GroEL—802 kDa). The results are shown in FIG. 7, which is a plot of scattering contrast vs sequence molecular weight and associated error bars. The results exhibit highly linear behaviour as expected given the linear dependence of iSCAT contrast on the volume of the object and the fact that all proteins are made from the same pool of amino acids, which in turn have a common refractive index and thus scattering cross section. The observed variation between expected and measured molecular mass is on average on the order of 3% of the mass that is to be determined. This demonstrates a high degree of accuracy in determining molecular weight of single protein molecules using the microscope 1.

It is anticipated that the microscope 1 is capable of quantifying the mass of objects as small as single proteins with an accuracy better than 5% of its mass, irrespective of their composition in terms of amino acids, lipids or carbohydrates.

It is anticipated that the microscope 1 is capable of quantifying changes in the mass of objects smaller than existing techniques, for example having masses below 5000 kDa and down to 10 kDa. Quantification of the instrumental precision was performed as follows. The precision in determining the mass of an object using the approach described herein is statistically limited by the ability to determine the centre of the distribution of scattering contrasts. Given that the recorded distribution exhibit Gaussian profiles as expected for a shot noise limited process, the precision is well-known to scale as $sN^{-1/2}$, where s is the standard deviation of the distribution of interest and N the number of samples taken. As a result, the precision of mass measurement is not limited by the resolution or accuracy, but can in principle be arbitrarily increased by increasing the number of measurements. To illustrate this, mass histograms of avidin were recorded in the absence (6839 events) and presence (6609 events) of saturating biotin in solution and the results are shown in FIGS. 8 and 9, respectively. A mass increase in the presence of biotin of 950±330 Da was measured compared to the expected 970 Da for four biotin molecules bound.

Quantification of the instrumental resolution and in particular the resolution limits, was performed by recording a mass histogram using the calibration obtained from the results illustrated in FIG. 6 of bovine serum albumin. The resulting histogram is shown in FIG. 10 and exhibits individual discernible peaks for monomers, dimers and trimers in solution with a fwhm of the monomer peak of 28 kDa leading to a resolution of 34 kDa. This value is a function of the total number of detected photons and can thus be improved by using higher light intensities. This demonstrates a high degree of mass resolution for the microscope 1. Taken together, these results illustrate that the microscope 1 is capable of quantifying mass differences as small as those induced by the binding of small molecules and both accurate and precise characterisation of an objects mass via the polarisability. Currently, this enables detection of single proteins down to 40 kDa and accurate determination of their molecular mass to within 5% of their sequence mass (FIG. 7). The high SNR furthermore enables the characterisation of changes in mass, for example through binding events with a precision that is only limited by the number of detected molecules, currently reaching 250 Da (FIGS. 8 and 9). In addition, the high achievable SNR enables the clear detection of different oligomeric states of proteins in solution enabling detailed characterisation of protein aggregation (FIG. 10).

Accordingly, the invention relates to a method of quantifying the mass of an object, wherein the mass of said object is quantified by interferometric light scattering. The method may also be described as interferometric light scattering mass spectrometry. The mass is typically quantified with up to about 5% mass error. By "mass error" is meant the % difference between the quantified mass using interferometric light scattering, and the actual mass of the object. The actual mass of the object may also be referred to as the "sequence mass" i.e. the mass calculated based on the sequence of the object molecule, which may be in kDa. Preferably, the mass is quantified with equal or less than about 2% mass error. The mass may be quantified with about 0.5% to up to about 5% mass error, about 1% to about 5% mass error, about 1.5% to about 5% mass error, about 2% to about 5% mass error, about 0.1% to about 2% mass error, about 0.5% to about 2% mass error, or about 1% to about 2% mass error.

The mass may be quantified within 5 kDa of, within 3 kDa of, within 2 kDa of, preferably within 1 kDa of the actual mass (e.g. sequence mass) of the object.

The object whose mass is to be quantified, such as quantified with a mass error described above, is typically of 19 kDa or greater in size. The object may more generally be from 10 kDa to 5000 kDa in size.

The object may be a single molecule, a macromolecule, a supermolecule or an association of molecule, macromolecules (such as polymers) and supermolecules. Examples of suitable macromolecules includes nucleic acid molecules, either natural nucleic acids such as deoxyribonucleic acid (DNA) or ribonucleic acid (RNA), or artificial nucleic acids such as peptide nucleic acid (PNA), Morpholino and locked nucleic acid (LNA), as well as glycol nucleic acid (GNA) and threose nucleic acid (TNA). Associations of molecules can include assemblies such as virus-like particles where envelope or capsid proteins are associated.

The object may be a weak scatterer of light. The object may be a single protein, and may be a glycoprotein. The object is typically in solution. The method of quantifying mass of the invention typically comprises use of an interferometric scattering microscope of the invention.

The invention further provides a method of measuring or quantifying a change in the mass of an object, wherein the change in mass of said object is measured or quantified by interferometric light scattering. The change in mass of the object may be quantified with any mass error as described above. The mass of the object before and after the change in mass is typically in a mass range as described above. The mass of the object may change due to one or more events selected from the group consisting of single molecule binding/unbinding, phase transition, clustering, assembly/disassembly, aggregation, one or more protein/protein interactions and/or one or more protein/small molecule interactions. The mass of the object may change due to oligomeric assembly or glycoprotein cross-linking. The change in mass of the object may be time-resolved (i.e. measured or quantified as occurring over a given period of time), optionally measured or quantified at a specific position and/or local concentration of said object. The use of interferometric light scattering for measuring changes in the mass of individual objects in a position and local concentration sensitive manner is also provided.

The method may allow for one or more interactions resulting in change in the mass of the object to be quantified. The method may further comprise determining thermodynamic and/or kinetic parameters influencing the change in the mass of the object or of one or more interactions resulting in change in the mass of the object. The method of quantifying change in mass of an object of the invention may comprise use of an interferometric scattering microscope of the invention.

The use of interferometric light scattering for quantifying mass of objects such as proteins and measuring/quantifying changes of mass of such objects (for example based on molecular interactions) was further investigated. Light-scattering-based imaging of individual biomolecules allowed the spatiotemporal characterization of their interactions and assembly.

Interferometric scattering microscopy was used to quantify the mass of single biomolecules in solution with 2% sequence mass accuracy, up to 19-kDa resolution, and 1-kDa precision. Interferometric light scattering was used resolve oligomeric distributions at high dynamic range, detect small-molecule binding, and mass-image proteins with associated lipids and sugars (carbohydrates). These capabilities enabled characterization of the molecular dynamics of processes as diverse as glycoprotein cross-linking, amyloidogenic protein aggregation, and actin polymerization. Interferometric scattering mass spectrometry provided spatiotemporally resolved measurement of a broad range of biomolecular interactions, one molecule at a time. This data is shown in the Examples.

The cellular processes underpinning life are orchestrated by proteins and their interactions. The associated structural and dynamic heterogeneity, despite being key to function, poses a fundamental challenge to existing analytical and structural methodologies. Biomolecular interactions and assembly are central to a wide range of physiological and pathological processes spanning length scales from small complexes to the mesoscale. Despite considerable developments in techniques capable of providing high-resolution structural information, they are typically static and involve averaging over many molecules in the sample, and therefore often do not fully capture the diversity of structures and interactions made. Solution-based ensemble methods enable dynamic studies but lack the resolution of separation required to distinguish different species. Single molecule methods offer a means to circumvent heterogeneity in both structure and dynamics, and significant progress has been made in terms of characterizing interactions and mechanisms. There existed no single-molecule approach, however, capable of quantifying and following the diversity of interactions made by biomolecules with sufficient spatiotemporal accuracy and resolution.

Given sufficient sensitivity, we viewed light scattering as an ideal means for detecting and characterizing molecules in low-scattering in vitro conditions because of its universal applicability. In an interferometric detection scheme (FIG. 10A), the scattering signal scales with the polarizability, which is a function of the refractive index and proportional to the particle volume. Combining the approximation that single amino acids effectively behave like individual nano-objects with the observation that the specific volumes of amino acids and refractive indices of proteins vary by only ~1% (FIG. 14; Table S1) suggests that the number of amino acids in a polypeptide, and thus its mass, is proportional to its scattering signal. This close relationship between mass and interferometric contrast, which has been predicted and observed to hold coarsely even at the single molecule level, could thus in principle be used to achieve high mass accuracy.

Building on recent advances in the experimental approach (FIG. 15) that improved imaging contrasts for interferometric scattering microscopy, we could obtain high quality images of single proteins as they diffuse from solution to bind non-specifically near the interface consisting of a microscope coverslip and the solution (FIG. 6). Reaching signal-to-noise ratios >10, even for small proteins such as bovine serum albumin (BSA), combined with an optimized data analysis approach, allowed us to extract the scattering contrast for each molecular binding event with high precision (FIG. 10C). These led to clear signatures of different oligomeric states, shown here for BSA with relative abundances of 88.63%, 9.94%, 1.18% and 0.25% of the detected particles (FIG. 10D). For non-specific binding to an unfunctionalized microscope coverslip as used here, surface attachment was effectively irreversible (12209 binding vs 372 unbinding events). As a result, we could determine (bulk) binding rate constants, which generally exhibited only small variations with oligomeric state that could be accommodated to obtain minor corrections to the recorded mass spectra and yield the solution distribution (FIG. 16). These results, including the detection and quantification of rare complexes such as BSA tetramers, demonstrate the ability of interferometric light scattering to work as interferometric scattering mass spectrometry (e.g. iSCAMS) to characterize solution distributions of oligomeric species and molecular complexes at high dynamic range.

The regular spacing in the contrast histogram of BSA confirms the expected linear scaling between mass and interferometric contrast. Repeating these measurements for eight different proteins, spanning 53-803 kDa, revealed a linear relationship (FIG. 11A, FIG. 18A). The deviation between measured and sequence mass was <5 kDa, resulting in an average error of 1.9%, and no detectable correlation with refractivity in relation to the overall shape of the molecule (FIG. 19A). Even for large structural differences, such as those between the extended and folded conformation of smooth-muscle myosin (530.6 kDa, FIG. 11A and FIGS. 18B and 20), we did not find measurable differences in the molecular mass beyond the mass increase expected for addition of glutaraldehyde molecules (Extended: 528.4±16.2 kDa, folded: 579.4±14.8 kDa, FIG. 18B) used to crosslink myosin into the folded conformation. The resolution, as defined by the full-width at half-maximum (FWHM) of the measured contrast reached 19 kDa for streptavidin. In all cases, the resolution was limited by photon shot noise and influenced by molecular mass, increasing from 19 kDa for streptavidin to 102 kDa for thyroglobulin (FIG. 19B, C). The sub-0.5% deviation from sequence mass for species of >100 kDa compares well to native mass spectrometry, and demonstrates the intrinsic utility of interferometric light scattering (e.g. iSCAMS) for the accurate mass measurement of biomolecules with oligomeric resolution.

Moving beyond species composed solely of amino acids, lipid nanodiscs represent an ideal system for testing the broad applicability of interferometric light scattering (e.g. iSCAMS) due to their flexibility in terms of polypeptide and lipid content. For nanodiscs composed of the MSP1D1 belt protein and DMPC lipids, we obtained a mass of 141.0±1.6 kDa, in good agreement with the range of masses reported by other methods, spanning 124-158 kDa (FIG. 11B and FIG. 17D). Replacing MSP1D1 with the smaller MSP1ΔH5 reduces the nanodisc diameter and the lipid content by ~20%, after accounting for the thickness of the protein belt.

Given the masses of MSP1D1 and MSP1ΔH5 (47 and 42 kDa, respectively), we predicted a mass for the MSP1ΔH5 nanodisc of 113.6 kDa, in excellent agreement with our measurement (114.1±1.9 kDa).

To see whether our approach also applies to solvent-exposed moieties that experience a different dielectric environment to those buried within a protein, we selected the HIV envelope glycoprotein complex (Env), which is a trimer of gp41-gp120 heterodimers. Env is extensively N-glycosylated, with the carbohydrates contributing to almost half of its mass. For an Env trimer mimic expressed in the presence of kifunensine, a mannosidase inhibitor that leads predominantly to unprocessed Man9GlcNAc2 glycans (FIG. 21), we recorded a mass of 350.0±5.7 kDa. Making the crude approximation that glycans and amino-acids have similar polarizabilities, this corresponds to a glycan occupancy of 74±3 out of 84 possible sites (FIG. 2C and FIG. 18E), consistent with recent observations of high occupancy for gp120 expressed with kifunensine. For Env expressed without kifunensine we recorded a lower mass of 315.3±10.5 kDa. The mass difference can only in part be attributed to the lower average mass of the processed glycans and yields a total N-glycan occupancy of 61±6. While the exact values for occupancy are beholden to our calibration (FIG. 11A), the presence of unoccupied sites is consistent with their observation in proteomics data.

The high precision of 1.8±0.5% with respect to the protein mass (FIG. 11A), indicates the potential for direct detection of small-molecule binding. To probe the current limits of interferometric light scattering (e.g. iSCAMS) in terms of precision, we therefore examined the biotin-streptavidin system (FIG. 11D, FIG. 18C), and measured masses for streptavidin in the absence (55.7±1.1 kDa) and presence (57.4±0.9 kDa) of biotin. This corresponds to a difference of 1.7±1.4 kDa, in good agreement with the expected 0.98 kDa for complete occupancy of the four binding sites. Upon addition of two different biotinylated peptides (3705.9 Da and 4767.4 Da), we obtained increases of 16.1±2.8 kDa and 22.0±2.2 kDa (compared to 14.8 kDa and 19.1 kDa expected) (FIG. 11D). These data show that interferometric light scattering (e.g. iSCAMS) can detect the association of kDa-sized ligands, demonstrating its suitability for highly sensitive ligand-binding studies in solution.

After having established the capabilities of iSCMAS, we sought to test it on more complex systems that are difficult to assess quantitatively with existing techniques as a consequence of heterogeneity and multi-step assembly mechanisms (FIG. 12). In addition, we aimed to monitor nucleation and polymerization dynamics of mesoscopic structures down to the single molecule level, which are challenging because of the simultaneous requirement for high dynamic range, imaging speed and direct correlation between the observed signals and the associated molecular events. The biotin-streptavidin system exhibits nearly covalent binding, raising the question whether interferometric light scattering (e.g. iSCAMS) is capable of not only determining mass distributions but also of quantifying weaker equilibria, as often encountered for protein-protein interactions.

We therefore investigated the interaction of Env with the anti-viral lectin BanLec, which neutralises HIV by binding to surface N-glycans via an unknown mechanism. We could monitor the interactions and short-lived complexes prior to aggregation, with the addition of BanLec to Env resulting in a reduction of single Env units coupled to the appearance of dimers and higher-order assemblies (FIG. 13A). The experimental oligomeric evolution coupled with a simple model (FIG. 13B) enabled us to extract the underlying association constants ($K_{BanLec}$=0.12 nM$^{-1}$, $K_{Env}$=8 nM$^{-1}$, $K'_{BanLec}$=0.4 nM$^{-1}$), in good agreement with recent bulk studies ($K_{BanLec}$=0.19 nM$^{-1}$), which also observed signatures of and estimated the energetics of a secondary binding event (K2=2.85 nM$^{-1}$). Our ability to follow and model the evolution of different oligomeric species allowed us to directly extract the interaction mechanism and the energetics underlying the lectin-glycoprotein interaction, despite the heterogeneity of this multi-component system. As a result, we can show that binding of Env to BanLec that is already bound to Env is much stronger than to free BanLec, a key characteristic of cooperative behavior. Moreover, the mass resolution of this approach enabled the inventors to quantify the number of BanLecs bound per dimer (1-2), trimer (2-3) and tetramer (3-4) of Env, demonstrating bivalent binding. These results are directly relevant to the characterization and optimization of anti-retrovirals, given that multivalency and aggregation have been proposed to be directly linked to neutralization potency. We anticipate similar quantitative insights to be achievable for other therapeutic target proteins and protein-protein interactions in general.

An advantage of our imaging-based approach stems from its ability to time-resolve mass changes. These mass changes can be resolved in a position- and local concentration-sensitive manner. Further, the mass of multiple objects can be measured over time, preferably in a location-dependent manner. The location may be sub-diffraction precise. This approach may enable the detection and/or quantification in the change of mass when these are due to the binding and/or dissociation of binding partners. Such results will give an indication and insight of the binding constants, $k_{on}$ and $k_{off}$. Alternatively, the approach may enable the determination of binding events which can be correlated to a single molecule fluorescence localization measurements to identify specific binding partners labelled with fluorescent molecules. Further, the addition of a molecule of known specificity (e.g. aptamer, antibody, antibody fragment or derivative, affibody, lectin, antigen or toxin) can be used to identify the nature of the molecule under observation.

The measurements of mass changes enables us to examine surface-catalyzed nucleation events that may eventually lead to amyloid formation. Previous studies using fluorescence labeling found aggregates of ~0.6 μm diameter within a minute of addition of the amyloidogenic protein α-synuclein at 10 μM to an appropriately charged bilayer. Upon adding α-synuclein to a planar, negatively charged DOPC/DOPS (3:1) membrane at physiological pH, we observed the appearance and growth of nanoscopic objects within seconds, even at low μM concentrations (FIG. 13A). While we were unable to determine the sizes of initial nucleating species or individual assembly steps, given the low molecular mass of α-synuclein (14 kDa), we could nevertheless monitor the nanoscale formation of associated structures in the range of hundreds of kDa and determine the kinetics (FIG. 13B). Growth of these clusters was uniform across the field of view, with the initial rates following expectations for a first-order process (FIG. 13B and FIG. 22A), pointing towards a simple growth mechanism. We did not detect such structures on neutral, DOPC-only bilayers, and found evidence for thioflavin-T positive aggregates after overnight incubation (FIG. 22B), suggesting that our assay probes early stages of amyloid assembly.

At the extremes of our current sensitivity, interferometric light scattering (e.g. iSCAMS) enables mass-imaging of mesoscopic self-assembly, molecule-by-molecule. In an actin polymerization assay, subtraction of the constant background revealed growth of surface-immobilized filaments.

In contrast to α-synuclein, where the growth of interest took place within a diffraction-limited spot, here we could quantify length changes of filaments larger than the diffraction limit upon the attachment and detachment of actin subunits (FIG. 13C, FIG.). We observed distinct, step-wise changes in the filament length (FIG. 13D), the most frequent forward and backward step sizes in the traces being 3.0±0.8 nm and 2.7±0.7 nm, respectively, remarkably close to the expected length increase of 2.7 nm upon binding of a single actin subunit to a filament (FIG. 13E). Detection of larger step sizes represents the addition of multiple actin subunits within our detection time window. The contrast changes associated with the different step sizes corresponded to mass changes of one, two, or three actin monomers binding to and unbinding from the tip of the growing filaments during acquisition. Even though we cannot yet distinguish between models invoking monomer or oligomer addition to a growing filament at our current level of spatio-temporal resolution, these results demonstrate the capability of interferometric light scattering (e.g. iSCAMS) for quantitatively imaging mesoscopic dynamics, and how they are influenced by associated proteins at the single molecule level.

We anticipate that combining interferometric light scattering (e.g. iSCAMS) with established surface modifications will dramatically expand its capabilities. Passivation decreases surface binding probabilities and thereby should provide access to much higher analyte concentrations (>μM), while surface activation will reduce measurement times at low concentrations (<nM). Specific functionalization and immobilization of individual subunits or binding partners could also allow for the determination of on and off rates in addition to equilibrium constants, and enable targeted detection in the presence of other analytes. These advances will make interferometric light scattering (e.g. iSCAMS) a powerful approach for dynamic in vitro studies of biomolecular interactions, assembly and structure at the single molecule level.

Materials and Methods

Protein Volume and Refractive Index Calculation

All protein sequences from *Escherichia coli, Yersinia pestis, Haloferax volcanii, Methanocadococcus jannaschii, Homo sapiens*, and *Arabidopsis thaliana* genomes were downloaded from NCBI (https://www.ncbi.nlm.nih.gov/genome/) in FASTA format. The refractive index of each protein was calculated as $$n = \sqrt{\frac{\left(\frac{2MR}{VN} + 1\right)}{\left(1 - \frac{R}{V}\right)}}$$

where $M = M_w + \Sigma_i(M_i - M_w)$ is the molar mass of the protein, determined from the sequence, and where the $M_w$-terms represent the loss of one water molecule per peptide bond; $R = \Sigma_i n_i$, is the sum of contributions from individual amino acid residues; $V = \Sigma_i V_i$, the specific volume, also determined from the contribution of individual residues; and N is the number of residues. $M_i$, $n_i$, and $V_i$ were determined from the residue type (Table S1). Wherever ambiguous FASTA codes were encountered (B, J, X, and Z), parameters ($M_i$, $n_i$, and $V_i$) were set to the arithmetic average for the possible residue types (e.g., the average of D and N for FASTA code B).

Microscope Coverslip Cleaning Procedure

We cleaned borosilicate microscope coverslips (No. 1.5, 24×50 mm², VWR, and No. 1.5, 24×24 mm², VWR) by rinsing them sequentially with $H_2O$, ethanol, $H_2O$, isopropanol, $H_2O$, ethanol and $H_2O$, followed by drying under a clean stream of nitrogen.

Landing Assay Procedure

Cleaned coverslips were assembled into flow chambers. Buffers were filtered through a 0.2 μm pore size syringe filter. All samples were diluted from stock solutions without further treatment. Sample proteins were diluted in 20 mM Tris-HCl, 100 mM NaCl, pH 7.4, unless otherwise stated. Typical working concentrations were 5-10 nM of the predominant species. After filling the flow chamber with buffer, a clean region of interest in the flow chamber was selected defined as being devoid of large scatterers on the surface, followed by flushing in 10 μl of the protein solution.

Calibration Proteins

Streptavidin (2105), bovine serum albumin (BSA, 2571), alcohol dehydrogenase (ADH, 8066), β-amylase (βA, 9988), thyroglobulin (2951) and GroEL (3955) were purchased from Sigma-Aldrich. Non-muscle myosin 2B (10042) was purified as described previously, except for the addition of a halo-tag. The numbers in parentheses indicate the total number of detected particles for each calibrant from 4-10 separate experiments.

Myosin Crosslinking

Smooth-muscle myosin (SMM) was purified as described previously and incubated at 200 nM in ATP-containing buffer (10 mM MOPS, 150 mM NaCl, 1 mM $MgCl_2$, 0.1 mM EGTA, 0.1 mM ATP, pH 7.0) for 30 min, which induced the folded (10S) conformation. Glutaraldehyde was added to a concentration of 0.1% (v/v) and incubated for 1 min. The reaction was stopped by addition of Tris-HCl (pH 8.0) to a final concentration of 100 mM.

Electron Microscopy

Cross-linked myosin was diluted to 20 nM in buffer containing 10 mM MOPS, 150 mM NaCl, 1 mM $MgCl_2$, 0.1 mM EGTA, pH 7.0. Native myosin was diluted to 5 nM in buffer containing 10 mM MOPS, 500 mM NaCl, 1 mM $MgCl_2$, 0.1 mM EGTA, pH 7.0, which induced the extended conformation. 3 μl of sample was applied to a carbon-coated copper grid (pretreated for 45 minutes with ultraviolet light) and stained with 1% uranyl acetate. Micrographs were recorded on a JEOL 1200EX II microscope operating at room temperature. Data were collected on an AMT XR-60 CCD camera.

Interferometric Light Scattering (e.g. iSCAMS) Measurements of Smooth-Muscle Myosin Native (6S) and cross-linked (10S) myosins were diluted in buffer containing 10 mM MOPS, 500 mM NaCl, 1 mM $MgCl_2$, 0.1 mM EGTA, pH 7.0, to a concentration of 5 nM and kept on ice until use. The landing assay was performed in a flow chamber as described above.

Biotin-Streptavidin Binding Assay

Streptavidin (Cat no. 54762) and D-biotin (Cat no. B4501) were purchased from Sigma Aldrich. Two synthetic N-terminally biotinylated peptides based on the sequences of desmoglein-3 (DSG3, biotin-EWVKFAK-PCREGEDNSKRNPIAKITSDYQA) and adrenocorticotropic hormone (ACTH, biotin-SYSMEHFRWGKPV-GKKRRPVKVYPNGAEDESAEAFPLEF) were bought from Cambridge Research Biochemicals. Samples of 5 nM streptavidin and mixes of 5 nM streptavidin with 500 nM of either biotin, biotin-DSG3 peptide or biotin-ACTH peptide were prepared at the start of the day and kept on ice until use. The total number of detected particles in 4-9 experiments were 2105, 2167, 3131 and 936 for streptavidin, biotin-streptavidin, biotin-DSG3-streptavidin and biotin-ACTH-streptavidin, respectively.

Experimental Setup

The experimental setup is depicted schematically in FIG. 6, and is identical to that described in FIG. 4 of Cole et al. (ACS Photonics. 4, 211-216 (2017)), except for the apparatus being mounted onto a 400×600×50 mm$^3$ aluminium plate and enclosed to minimize the influence of external perturbations. Briefly, the collimated output of a 445 nm laser diode (Lasertack) is passed through an orthogonal pair of acousto-optic deflectors (AODs; AA Opto Electronic, DT SXY-400). A 4f telecentric lens system (Telecentric lens 1, and Telecentric lens 2) images the deflection of the beam by the AODs into the back focal plane of the microscope objective (Olympus, 1.42 NA, 60×) after passing through a polarizing beam splitter (PBS) and a quarter-wave-plate (QWP). This results in a weakly focused beam (spot size 1.5 µm) being scanned across the sample to generate the field of view. The objective collects the light reflected at the glass-water interface together with that back-scattered by the sample, which is separated from the incident light by the combination of the PBS and QWP. A second 4f telecentric system (Lens 1 and Lens 2) reimages the back focal plane of the objective, where a partially reflective mirror consisting of a 3.5 mm diameter thin layer of silver deposited onto a window selectively attenuates the reflected light by more than two orders of magnitude with respect to light from point scatterers at the surface. A final lens (Lens 3) images the sample onto a CMOS camera (Point Grey GS3-U3-23S6M-C) with 250× magnification, giving a pixel size of 23.4 nm/pixel. The focus position is stabilized with an active feedback loop using a total internally-reflected beam (not shown).

Data Acquisition Parameters

The camera was run close to the highest frame rate achievable for the given field of view, typically 1 kHz. Unless otherwise stated, images were pixel-binned 3×3 and time-averaged 10-fold prior to saving, giving a final pixel size of 70.2 nm and effective frame rate of 100 Hz. The power density, frame rate, exposure time and effective exposure time after averaging were: FIGS. 1B-D, 2D, S3, S4A and E, S5C, S6B: 860 kW/cm$^2$, 1000 Hz, 0.95 ms, 47.5 ms; FIGS. 2A, 3, S4F, S5A and E, S6A and C: 420 kW/cm$^2$, 662 Hz, 1.5 ms, 300 ms; FIG. S5B: 500 kW/cm$^2$, 662 Hz, 1.5 ms, 300 ms; FIGS. 2B and C, S5D and E: 280 kW/cm$^2$, 662 Hz, 1.5 ms, 300 ms; FIGS. 13A and B, S22A: 45 kW/cm$^2$, 100 Hz, 9.9 ms; FIGS. 13C-E: 88 kW/cm$^2$, 468 Hz, 2.1 ms, 16.8 ms.

Image Processing: Background Removal

Unless otherwise stated, analysis was performed using custom software written in LabVIEW. To remove the static scattering background from the glass surface, ratiometric images, R, were calculated as $R=N_{m+1}/N_m-1$, where $N_m$ are consecutive normalized averages of several images, revealing only those features that change between the two frame batches (FIG. 15B). Each frame batch is normalized by the mean pixel value before generating the ratiometric image to avoid effects caused by slow laser intensity fluctuations. This processing is stepped through the raw movie frame-by-frame, generating a ratiometric frame stack in which a binding event appears as a (dark) point spread function (PSF), the contrast of which increases and then decreases as the midpoint of the two frame batches approaches and then moves past the time at which the protein binds (FIG. 15C, D). Unbinding events, meanwhile, appear as bright spots and are insignificant in number compared to binding events for landing assays on bare glass. For example, for the data shown in FIG. 10, we observed 12209 binding vs 372 unbinding events.

Image Processing: Particle Detection and Quantification

Particles were identified in the ratiometric images by an automated spot detection routine. As a first step, the convolution of the ratiometric image with the experimentally measured PSF was calculated to assist with particle detection. From the resulting image, a particle probability (PP) image was calculated as described previously, and pixels with PP>0.3 that also corresponded to a local maximum in the convolved image were taken as candidate particles.

About each candidate pixel, an 11×11 pixel$^2$ (772×772 nm$^2$) region of interest was extracted and fit to a model PSF to extract the contrast. In place of the more conventional 2D Gaussian function, we used a difference of two concentric 2D Gaussians to model the effect of the circular partial reflector in the Fourier plane on the PSF. The width and amplitude of the second Gaussian (arising from the presence of the partial reflector) were dictated by the relative sizes of the partial reflector and objective back aperture, and the reflectance of the mask, thus avoiding additional parameters in the fit:

$$f(x, y) = A\left(e^{-\left[\frac{(x-x_0)^2}{2\sigma_x^2} + \frac{(y-y_0)^2}{2\sigma_y^2}\right]} - \frac{(1-T)}{s}e^{-\left[\frac{(x-x_0)^2}{2(s\sigma_x)^2} + \frac{(y-y_0)^2}{2(s\sigma_y)^2}\right]}\right) + b$$

where s=8.52/3.5, is the ratio between the diameter of the objective back aperture and the diameter of the partial reflector, and T is the transmission of the mask. The contrast reported is therefore $$A\left(1 - \frac{(1-T)}{s}\right),$$

corresponding to the peak value of this function as it appears in an image. If the fitted function was too eccentric it was rejected as not arising from a single molecule binding event. This was determined by taking the ratio of the smaller to the larger of the two fitted standard deviations ($\sigma_x$ and $\sigma_y$), and rejecting the fit if this ratio was below 0.7.

As described above, the sliding ratiometric analysis results in a single molecule binding event appearing in several consecutive frames, with increasing and then decreasing contrast. To avoid over-counting particles, and to extract the most accurate measure of the particle contrast, the fits were grouped into those arising from a single particle based on their spatial and temporal location in the image stack. Points lying within 1 pixel of each other and arising from frames within a window size of twice the temporal frame averaging were classified as one particle. The contrast of a given particle as a function of time in the image stack then exhibits a linear growth up to a maximum, followed by a linear decrease. For each particle, this profile was fit to a pair of straight lines with gradients of equal magnitude but opposite sign, and the peak contrast taken to be the best estimate of the true particle contrast (FIG. 15D).

To extract accurate values for the mean contrast (FIG. 11), the resulting contrast distribution was fit to one or the sum of two Gaussian peaks (a Gaussian function when a single peak was well-isolated from other detected species, or the sum of two Gaussians where two peaks were not fully separated). Fitting was performed using the maximum-likelihood procedure as implemented in MEMLET. To optimize the fit by maximum-likelihood, it was necessary to reject outlying data points from the distribution (e.g. from the presence of some smaller species in solution, or larger aggregates). For unimodal distributions, for example, outliers were defined as those points either with a contrast less than the lower quartile minus 1.5 times the interquartile range, or greater than the upper quartile plus 1.5 times the interquartile range.

The dependence on sequence mass of the average value of the contrast determined in this way for each of the 8 proteins listed above was fit to a straight line in order to calibrate the system. We used the difference between the line of best fit and the measured data to assess the accuracy of the technique, resulting in the average deviation of 1.9% from the sequence mass reported in the main text.

Surface Vs Solution Distributions and Corrections

In landing assays, we detect individual molecules binding to the cover glass surface, rather than directly in solution. As a result, variations in surface affinities and/or collision rates could in principle lead to a deviation of the surface-measured distribution from the true solution distribution. We can, however, extract binding rates directly from our experimental data. For this, we employ standard flow cells that exhibit large surface-to-volume ratios. As a result, binding to the surface reduces the analyte concentration throughout the experiment, as can be seen in FIG. 10D. We remark that this decay in sticking frequency cannot be attributed to surface saturation, because (a) we can add more sample to a flow chamber a few times and still observe binding, (b) for a 4×9 µm² field of view, a tightly packed monolayer of 5 nm diameter particles would contain ~1.8×10⁶ particles, while we typically measure 10³ binding events in an experiment, and (c) the lack of unbinding implies that we deplete the concentration in solution with time. The measured drop in binding frequency is well described by an exponential decay, consistent with a simple first-order process of protein molecules in solution binding to the glass surface with a given rate constant (FIG. 17A), which provides representative decay constants from multiple movies (FIG. 17B). Because we have sufficient mass resolution to distinguish different oligomeric states, we can characterise the decay in binding rate for each oligomeric state, measuring a rate constant which is a function of the surface sticking probability and the collision rate, which in turn is proportional to the diffusion coefficient.

The values of these rate constants for different oligomers and different species studied in this manuscript exhibit variations of less than ±25% from the mean decay for all oligomeric species per protein. For BSA, Env, smooth-muscle myosin and GroEL we observe a decrease in decay rate with molecular weight. For systems where we observe decay of a native, globular oligomeric structure into smaller subunits (ADH, β-amylase), the pattern is inverted. Importantly, the decay rates are highly reproducible with narrow standard deviations, demonstrating that they can be characterised with high accuracy on an oligomer-to-oligomer basis. We found excellent correlation between the absolute rate constant and the (molecular weight)$^{-1/3}$, i.e. the scaling of the diffusion coefficient with mass assuming spherical objects, suggesting that the surface affinity for different oligomeric states, and indeed different proteins, does not vary significantly (FIG. 17D).

To probe the effect of diffusion and surface attachment on oligomeric distributions and resulting thermodynamics parameters, we can apply a correction to the counted numbers of each oligomer depending on the measured binding rate constant. Assuming that any change in the equilibrium distribution as a result of this dilution is slow compared to the timescale of the experiment, then to accurately count the proportion of each oligomer present in solution, one would have to integrate over the exponential decay in binding events from the addition of sample (time, t=0) until all binding has ceased. Experimentally, meanwhile, we effectively integrate from some time $t_0 \approx 15$ s after addition of sample up to a later time $t_f$ when the acquired movie ends. We can relate these two via $$N_i = M_i \frac{e^{k_i t_0}}{1 - e^{-k_i(t_f - t_0)}}$$

where $N_i$ is the number of particles of oligomer i counted over the full integral, $M_i$ is the number measured experimentally, and $k_i$ is the binding rate constant for oligomer i.

As shown for BSA (data not shown) corrections produce noticeable, but nevertheless small corrections to the mass distributions. While one might assume that the correction should lead to an increase in the dimer fraction because of compensation for diffusion, we find the opposite to be true. This is caused by the fact that we have to take into account the delay ($t_0$) between addition of the sample and observation of binding events, which is usually on the order of 15 s. During this time, a higher proportion of the smaller oligomers are lost to the surface, which leads to the measured correction factor. We observe similar effects for our Env-BanLec experiments (FIG. 17F), where the correction causes changes in the mole fractions that are within the error associated with our ability to model the experimental data.

We conclude that non-specific binding to microscope cover glass only weakly influences the oligomeric distributions determined by interferometric light scattering (e.g. iSCAMS), suggesting that our measurements are representative of solution distributions, especially given the fact that they can be corrected by quantifying the probability of surface attachment and diffusion coefficient as a function of oligomeric state.

Accuracy, Noise Floor, Resolution and Precision

The mass deviation between sequence mass and measured mass according to a linear correlation from calibration proteins was <5 kDa. Comparison with molecular shape factor as extracted from structural data exhibited no clear correlation in magnitude or in sign. Therefore, at this stage we cannot quantitatively connect accuracy, mass and refractivity beyond a general rule that the accuracy is limited to a few kDa, which causes the percentage deviation to increase for smaller object mass as shown in the upper panel of FIG. 11A.

The noise floor of our approach, as defined by the standard deviation of background images recorded in the absence of biomolecules, decreases as expected for a shot noise-limited process for image averaging up to several tens of ms, after which it begins to deviate, with a minimum near 300 ms (FIG. 19B). We believe that the deviation is largely caused by sample drift, causing the surface roughness to begin to contribute to the ratiometric images. The noise floor represents the instrumental limit to mass resolution manifested in the width of the recorded mass distributions. In addition, we found that this width increases with mass (FIG. 19C), an effect that may be expected in the presence of an additional uncertainty that scales with size of the object measured. We currently believe that the source of this additional broadening is largely caused by the rough glass surface, which exhibits ±40% peak-to-peak variations in reflectivity in our experimental arrangement.

The theoretical precision, at least in the context of unimodal mass distributions is given by $\sigma/\sqrt{N}$, where $\sigma$ is the standard deviation of the distribution and N the number of events measured. We find that this relationship frequently holds only for N<100, leading to a precision on the order of 2% of the object mass (see FIG. 11D). As above, we believe that the most likely limiting factors are the glass roughness and our ability to precisely determine the focus position from experiment to experiment in a repeatable fashion, inducing contrast and thus mass variations beyond the theoretical expectation.

Lipid Nanodiscs Preparation and Procedure

Membrane scaffold proteins were expressed in *E. coli*, purified and assembled by addition of lipids in the molar ratios specified in Table S2, followed by purification by size exclusion chromatography as described previously. The nanodiscs were diluted to 10 nM in 20 mM Tris, 100 mM NaCl, pH 7.4, and nonspecific binding to a glass surface was measured according to the procedure described above. For comparison with expected masses for each sample, we took literature values (Table S3) for the mass of the MSP1D1 nanodisc with DMPC (1,2-dimyristoyl-sn-glycero-3-phosphocholine), which we took as a reference, as measured by a variety of techniques to provide a range of expected masses. For each of these, including our own, we calculated an expected mass for the MSP1ΔH5 nanodisc with DMPC. This was done by subtracting the mass of the protein component and scaling the resulting mass of lipid by the reduction in area of the bilayer patch calculated from the square of the reduction in diameter of the nanodisc as measured by size exclusion chromatography (SEC), dynamic light scattering (DLS) and electron microscopy (EM). The expected mass of the nanodisc follows by addition of the MSP1ΔH5 protein mass (Tables S3 and S4).

Similarly, for the MSP1D1 nanodiscs with varying lipid composition, we calculated a range of expected masses from the various reported measurements of the reference nanodisc. We scaled the measured lipid mass according to the expected changes due to different total number of lipid molecules per nanodisc (from the protein:lipid assembly ratio) and different average mass per lipid molecule. Again, addition of the mass of protein leads to the expected masses of the nanodiscs (Tables S5 and S6). The total number of detected particles were 14216 (MSP1D1-DMPC), 3041 (MSP1D1-DMPC/PC14:1/Chol), 2292 (MSP1D1-PC14:1/Chol), 2277 (MSP1 Δ1-DMPC) from 2-12 experiments.

Env and BanLec Preparation and Procedure

Env SOSIP (BG505) and BanLec were prepared as described previously, either in the presence or absence of kifunensine. The proteins were each diluted to 5 nM in phosphate buffered saline (PBS) and binding to a glass surface was imaged in a flow chamber as described for the landing assay. The total number of detected particles were 15391 and 8048 for kifunensine-treated and wildtype Env, respectively.

For the interaction studies between Env and BanLec, Env was diluted to 20 nM in PBS. BanLec was diluted to 2-fold the working concentration in PBS. The protein dilutions were kept on ice until use. Env was mixed 1:1 with either PBS (as a control) or BanLec, and incubated for 5 min at room temperature. Next, 20 µl of the mixture were flushed into a PBS-filled flow chamber, and landing on the glass surface immediately recorded. The kernel density estimates of the probability densities shown in FIG. 12A were generated using a Gaussian kernel with bandwidth of 30 kDa. The number of each observed Env cluster was determined by counting landing events within resolvable contrast intervals, i.e. monomers, dimers, trimers, tetramers and above. In order to determine how many individual Env molecules were present in each population, the number of landing events was multiplied with the respective number of Env units per oligomer (1 for monomeric Env, 2 for dimeric Env, 3 for trimeric Env, etc.). In this way, the fraction of Env molecules in clusters and relative abundance of the different species (FIG. 12B) could be calculated.

In order of increasing BanLec concentration, the total number of detected particles were: 4446, 4841, 3068, 3106, 6258, 3893, 7370, 4198, 3412, 3027, 3674, 4287, 3790.

Modelling of Env-BanLec Interaction

We modeled the Env (A) BanLec (B) system as $$A+A \rightleftharpoons A_2 K_d$$

$$A+B \rightleftharpoons AB K_{BanLec}$$

$$A_n B_n + A \rightleftharpoons A_{n+1} B_n K_{Env}$$

$$A_{n+1} B_n + B \rightleftharpoons A_{n+1} B_{n+1} K'_{BanLec}$$

From these equilibria, the concentration of each oligomer can be expressed in terms of a combination of equilibrium constants and powers of [A] and [B]. Using the fact that the total number of each monomer is conserved, i.e.

$$[A]_0 = [A] + 2[A_2] + [AB] + \sum_{i=m}^{\infty} \sum_{n=m-1}^{m} m[A_m B_n]$$

$$[B]_0 = [B] + [AB] + \sum_{i=m}^{\infty} \sum_{n=m-1}^{m} n[A_m B_n]$$

where $[A]_0$ and $[B]_0$ are the initial concentrations, we thus obtained two simultaneous equations to solve (numerically) for [A] and [B] in terms of the equilibrium constants and the initial concentrations. Once [A] and [B] are known, the concentrations of all other species follow from the equilibrium conditions.

We obtained very good agreement with experiment for $K_{Env} \approx 8$, $K_{BanLec} \approx 0.4$, $K'_{BanLec} \approx 0.12$, and $K_d \approx 0.004$ all in units of $(nM)^{-1}$. The initial concentration of Env in the calculation was taken to be 10 nM.

Supported Lipid Bilayer (SLB) Preparation

CultureWell silicone gaskets (Grace Bio-Labs) were cut and placed onto a freshly cleaned coverslip providing four independent 30-50 µl sample chambers on the same substrate. Stock solutions of 1,2-dioleoyl-sn-glycero-3-phosphocholine (DOPC) and 1,2-dioleoyl-sn-glycero-3-phospho-L-serine (DOPS) in chloroform were purchased from Avanti Polar Lipids (Alabaster, AL). The DOPC:DOPS (3:1) mixture was dried to a film, kept under vacuum for at least 1 h and brought to a concentration of 1 mg ml$^{-1}$ in bilayer buffer (10 mM HEPES, pH 6.8, 200 mM NaCl, 2 mM CaCl$_2$). Using a mini-extruder (Avanti Polar Lipids), the suspension was then forced 21 times through a single membrane with a pore size of 100 nm. SLBs were formed by vesicle fusion inside the chamber on cleaned coverslips that have been passed through a blue flame. After 5-10 min incubation, excess vesicles were removed from the chamber by rinsing with 10 mM sodium phosphate buffer, pH 7.0.

α-Synuclein Preparation

The construct was expressed and purified as described previously, lyophilized and stored at −20° C. The lyophilized protein was dissolved at a final concentration of 1-1.5 mM in 20 mM sodium phosphate, pH 7.0. In order to allow complete dissolution of the protein powder, the pH of the α-synuclein solution was adjusted to 7.0 with 1 M sodium hydroxide.

α-Synuclein Aggregation Imaging and Analysis

Before addition to the SLBs the protein was diluted in sodium phosphate buffer. 10 µl of α-synuclein solution added to a sample volume of 30 µl, yielding the final reported concentrations. Addition of α-synuclein was recorded at 100 frames/s and aggregate formation was followed for 20 s. The acquired images consisted of 512× 512 pixels$^2$ with a pixel size of 23.4 nm/pixel, resulting in a field of view of 12×12 µm$^2$. As with the protein binding assays, these images were 3×3 pixel-binned before additional processing, giving a final pixel size of 70.2 nm/pixel. To capture the initial growth, the entire image stack was divided by a background image. The background was chosen as the average of frames before addition of α-synuclein. After selecting an 11×11 pixel$^2$ region of interest centred on each growing aggregate, we fitted this region in each frame to the difference-of-two-Gaussians model function, as described for the analysis of protein landing events. The contrast was plotted as a function of time, and the initial growth rate was determined by a linear fit for 0.1-1 s of data after addition of α-synuclein, depending on concentration.

Preparation of Biotin-PEG Flow Chambers for Actin Polymerization Assays

Microscope cover glass (No. 1.5, 24×50 mm$^2$, VWR) was sonicated sequentially in 2% Hellmanex, H$_2$O and ethanol each for 10 min, then 0.1 M KOH for 15 min and finally 5 min in H$_2$O. In between each step, they were washed with H$_2$O to remove excess solution from the previous step. All coverslips were individually rinsed with H$_2$O and ethanol, then blow-dried with a clean stream of nitrogen. A solution of 2 mg ml$^{-1}$ mPEG-silane (MW 2000, LaysanBio) and 0.1 mg ml$^{-1}$ biotin-PEG-silane (MW 3400, LaysanBio) in 80% ethanol at pH 2.0 (adjusted with HCl) was prepared immediately before being sandwiched between two cleaned coverslips. The sandwiches were incubated in petri-dishes at 70° C. for 16 h. The biotinylated coverslips were vigorously rinsed with H$_2$O and ethanol in an alternating fashion removing any dried excess PEG, then blow-dried with a clean stream of nitrogen. Small coverslips (No. 1.5, 24×24 mm$^2$, VWR) were rinsed with H$_2$O and ethanol in an alternating fashion and blow-dried with nitrogen. Flow chambers were assembled as described above. The flow chambers were stored in a dry nitrogen atmosphere at −20° C.

Actin In Vitro Polymerization

Rabbit skeletal muscle actin was purified as described previously. Biotinylated actin was purchased from Cytoskeleton Inc. (Denver, USA, Cat. no. AB07-A). Avidin (Cat. no. A9275) was purchased from Sigma Aldrich. A biotin-PEG flow chamber was filled with G-actin buffer (2 mM Tris-HCl, 0.2 mM CaCl$_2$, pH 8.0), flushed with 40 µl of 10 µg ml$^{-1}$ avidin in G-actin buffer and incubated for 5 min. Excess avidin was flushed out with 40 µl of G-actin buffer. Immediately before addition to the flow chamber, polymerization of a mixture of G-actin and 1% biotinylated G-actin (final concentrations: 300-1000 nM actin, 3-10 nM biotin-actin) in G-actin buffer containing 0.2 mM ATP and 2 mM DTT was induced by adding 1/10 of a volume of 10×KMEH buffer (1× concentration: 10 mM HEPES, 50 mM KCl, 2 mM MgCl$_2$, 1 mM EGTA, pH 7.4). A volume of 50 µl of the polymerization mixture was flowed into the chamber. A 9×9 µm$^2$ field of view was recorded at 468 frames/s.

Actin Polymerization Data Analysis Procedure

Actin polymerization were analyzed using custom software written in LabVIEW. The raw video was 2×2 pixel-binned, resulting in an effective pixel size of 46.8 nm/pixel. To visualize the actin filaments on top of the signal from the glass surface roughness, a background image was created by taking a median of 20 raw images, and used to background-correct subsequent frames. To reduce shot noise, 8 consecutive frames were averaged, which gave an effective frame rate of 58.5 Hz. Actin filament tips were tracked by selecting a region of interest that included only the tip to be analyzed. Each frame of this region was then fit using a filament tip model function, consisting of a Gaussian wall $w(x, y)$ starting at $x_0$ and $y_0$ running in direction $\theta$ with width $\sigma$:

$$w(x, y) = \exp\left[-\frac{((x - x_0) \sin \theta + (y - y_0) \cos \theta)^2}{2\sigma^2}\right]$$

which is attached to half of a symmetric 2D Gaussian $g(x, y)$ having its centre at $x_0$ and $y_0$ with width $\sigma$ $$g(x, y) = \exp\left[-\frac{(x - x_0)^2 + (y - y_0)^2}{2\sigma^2}\right]$$

The two functions are attached to each other by defining the border $b(x, y)$ between them in the following manner:

$$f(x, y) = (y - y_0) \cos\left(\theta - \frac{\pi}{2}\right) - (x - x_0) \sin\left(\theta - \frac{\pi}{2}\right) + 0.5$$

$$b(x, y) = \begin{cases} 0, & f(x, y) < 0 \\ f(x, y), & 0 \le f(x, y) \le 1 \\ 1, & f(x, y) > 1 \end{cases}$$

The tip function $t(x,y)$ with an amplitude A is then created as:

$$t(x,y) = A[b(x,y)g(x,y) + 1 - b(x,y))w(x,y)]$$

A LabVIEW representation of this function was fitted to the filament tip images using the Levenberg-Marquardt algorithm. The filament tip position was defined by the best fit values for $x_0$ and $y_0$. The trajectories were rotated such that the growth axis was aligned with the x-axis of the coordinate system. Step traces as shown in FIG. 13D were created by plotting the x-axis position vs. time.

Steps were automatically detected by a LabVIEW implementation of a previously described step finding algorithm. Briefly, we describe the step traces as a sequence of values, $x_1, x_2, \ldots, x_n$, which are drawn from an unknown number of normal distributions of equal variance ($\sigma^2$) but different means ($\mu$). The algorithm then searches for the change points of $\mu$, i.e. step positions, in the data series, one at a time. This is done by segmenting the sequence at each position $k=1, \ldots, n-1$ and testing the null hypothesis $$H_0: \mu_1 = \mu_2 = \ldots \mu_n$$

against the alternative $$H_1: \mu_1 = \ldots = \mu_{k_0} \ne \mu_{k_0+1} = \ldots = \mu_n$$

where $1 < k_0 < n$ is the unknown position of a change point. Once a change point is found the sequence is divided into two sequences before and after the accepted change point. For each sequence the process is repeated until no more change points are found, i.e. the null hypothesis is accepted.

Hypothesis testing was performed based on the principle of minimization of the Schwarz information criterion (SIC), defined by $$SIC = p \log n - 2 \log L(\theta)$$

where $L(\theta)$ is the maximum likelihood function for the model, p is the number of free parameters in the model, and n is the sample size. With SIC(n) being the SIC under $H_0$, and SIC(k) being the SIC under $H_1$, for a change point at a position k=2, ..., n−2. The hypothesis $H_0$ is accepted if $SIC(n) \leq \min_k SIC(k)$, otherwise $H_0$ is rejected if there is a k for which SIC(n)>SIC(k). The change point position is chosen to be where SIC(k) is smallest in the data sequence. For our case, assuming a shifting mean and a constant variance, the two SIC values are obtained as $$SIC(n) = n\log 2\pi + n\log \sigma^2 + n + 2\log n$$

$$SIC(k) = n\log 2\pi + k\log \sigma_1^2 + (n-k)\log \sigma_n^2 + n + 3\log n \text{ where}$$

$$\sigma^2 = \frac{1}{n}\sum_{i=1}^{n}(x_i - \bar{x})^2,$$

$$\sigma_1^2 = \frac{1}{k}\sum_{i=1}^{k}(x_i - \bar{x})^2, \text{ and}$$

$$\sigma_n^2 = \frac{1}{n-k}\sum_{i=k+1}^{n}(x_i - \bar{x})^2.$$

Since this method works solely based on comparison of the SIC values, it does not require any input other than the data sequence and finds steps without user bias. We only included change points that are at least three data points apart from another, in order to eliminate steps that are found based on large fluctuations on a very short timescale. We emphasize that changing the minimum delay had a negligible effect on the obtained step sizes (FIG. 23E,F). The distribution of step sizes was described by a Gaussian mixture model using the expectation maximization algorithm in MATLAB. Errors of the fitting parameters were estimated using a bootstrap procedure with 1000 bootstrap samples.

Phalloidin-Actin Control Experiment

We attempted a control experiment with static actin filaments to provide a baseline in terms of filament end tracking and to determine whether any end displacements could result from the entire filament moving across the surface. Unfortunately for this experiment, actin filaments are generally dynamic at their ends and the absence of G-actin in solution causes their depolymerisation. G-actin at the critical concentration causes no net growth, but subunits will exchange at the filament tips. To minimize this effect, we used the actin filament stabilizer phalloidin. A mixture of 10 µM G-actin and 0.1 µM biotin-G-actin in G-actin buffer containing 0.2 mM ATP and 2 mM DTT was polymerized for 1 h at room temperature by adding 1/10 of the volume of 10×KMEH. It was then diluted 5-fold in 1× KMEH and mixed with 3 µM phalloidin (Sigma P2141) in 1×KMEH. The filaments and phalloidin were incubated overnight at 4° C. On the day of the experiment, the phalloidin-stabilized filaments were diluted to 100 nM in 1×KMEH and kept on ice until use. The biotin-avidin-flow chambers were prepared as described above, then 30 µl phalloidin-actin were added. The attachment of filaments was monitored under similar imaging conditions as the polymerization experiments.

The presence of phalloidin markedly reduced any dynamics at the filament tips, but did not fully stop them at our levels of sensitivity. We could, however, correlate the displacements of the two ends of individual filaments in order to rule out that any tip position fluctuations are caused by an overall movement of the filaments. We selected 9 short phalloidin-stabilized filaments whose two tips were both visible and isolated from other filaments (FIG. 23A). We tracked both tips and determined their displacements along the filament axis as described above, orienting the resulting trajectories such that the two tips were facing opposite directions. We found no correlation between the displacements of the two tips on the same filament (FIG. 23B) suggesting that length fluctuations at the two filament ends are not caused by movement of the filament.

Actin Filament Growth Simulation

To test the fidelity of our step finding algorithm, custom written software in LabVIEW created movies of growing actin tips. The model function described in the actin polymerization data analysis procedure section was used to generate actin filament tips with amplitude A=−0.06 and width σ=1.7 pixels in a 15×15 pixel$^2$ image, which is similar to the experimental values assuming a pixel size of 46.8 nm. The experimental shot noise level was determined by dividing the respective pixel values of one frame in the experimental videos (averaged to 58.5 Hz) by those of the previous frame and determining the standard deviation of the pixel values in the resulting differential images. The LabVIEW Gaussian noise generator was used to produce images with the experimental shot noise level (1.8×10$^{-3}$), which was then added to the filament tip images. The length of the actin filament tip was extended or shortened in consecutive frames by moving the tip position a defined distance (here 1, 2, 2.7, 4, 5 or 8 nm) forward or backward along the filament axis.

The dwell times of the tip between forward steps or backward steps were randomly chosen from two pools of exponentially distributed dwell times generated according to T=−ln U/k, where T is the dwell time, U a uniformly distributed random number between 0 and 1, and k the rate constant. The rate constant for subunit attachment (forward step) $k_1$ was 4.887 s$^{-1}$ and the rate for subunit detachment (backward step) Li was 2.103 s$^{-1}$, both based on experimentally determined kinetics (FIG. 23C at 0.3 µM). The dwell times were used to create a sequence of attachment and detachment events, which were treated independently, for a time period of at least the length of the simulated video. For a simulated video of 15 s at 58.5 Hz frame rate the program checks each frame whether an event is due according to the sequence of events generated before and either executes the event or leaves the filament unchanged. Multiple events happening during one frame time is possible and accounted for. The simulated image sequences are analyzed in the same way as the experimental videos as described in the actin polymerization data analysis procedure section. The simulation with 2.7 nm step size matches our step size histogram in FIG. 13E well, with smaller steps detectable, albeit returning a larger than defined step size (FIG. 23D). Overall, these simulations demonstrate that the assumption-free step-detection algorithm is capable of robustly identifying and quantifying 2.7 nm given the experimental noise level.

Determination of Actin Macroscopic Growth Rates

A smoothing spline was fitted to the 2D trajectories obtained from tracking actin filament tips, as in the actin polymerization data analysis procedure section. The length of this spline was used as the average tip displacement d. The average elongation velocity v of the filament tip was calculated according to $$v = \frac{d \times F_r}{n}$$

where $F_r$ is the frame rate and n the number of frames, leading to the average elongation rate $$r = \frac{v}{A_s}$$

where $A_s$ is the actin subunit size, assumed to be 2.7 nm. This procedure was repeated for a number of actin filaments growing at different actin concentrations. The elongation rate as a function of actin concentration can be described by $$r = k_{+1}[\text{actin}] - k_{-1}$$

where $k_{+1}$ is the subunit association rate constant, $k_{-1}$ is the subunit dissociation constant and $K_{crit} = k_{-1}/k_{+1}$ is the critical concentration for actin polymerization. The critical concentration (129±151 nM) and rate constants ($k_{+1}$=16.3±5.0 μM$^{-1}$ s$^{-1}$ and $k_{-1}$=2.1±2.4 s$^{-1}$) obtained from FIG. S23C agrees well with previous studies.

TABLE S1

Contributions to R, $V_i$, and $M_i$ for the canonical amino acids.

| Amino acid | $n_{aa}/g$ | $V_i/(\text{cm}^3/\text{mol})$ | $M_i/\text{Da}$ |
|---|---|---|---|
| A | 0.242 | 54.26723 | 89.0932 |
| R | 0.253 | 116.12344 | 174.201 |
| N | 0.229 | 76.79325 | 132.1179 |
| D | 0.227 | 70.52933 | 133.1027 |
| C | 0.238 | 62.33805 | 121.1582 |
| Q | 0.237 | 89.98362 | 146.1445 |
| E | 0.233 | 84.80384 | 147.1293 |
| G | 0.225 | 38.42674 | 75.0666 |
| H | 0.253 | 95.94639 | 155.1546 |
| I | 0.282 | 99.31927 | 131.1729 |
| L | 0.279 | 99.13858 | 131.1729 |
| K | 0.266 | 102.391 | 146.1876 |
| M | 0.263 | 101.00571 | 149.2113 |
| F | 0.287 | 116.54505 | 165.1891 |
| P | 0.245 | 74.14313 | 115.1305 |
| S | 0.22 | 56.73666 | 105.0926 |
| T | 0.236 | 72.276 | 119.1192 |
| W | 0.297 | 139.55291 | 204.2252 |
| Y | 0.272 | 118.71333 | 181.1885 |
| V | 0.27 | 83.77993 | 117.1463 |

TABLE S2

Composition key (all with MSP1D1 as the scaffold protein).

| Composition | Lipid | Percentage | Mass/Da | Average Lipid Mass/Da | Protein:lipid assembly ratio | Relative mass of lipid content |
|---|---|---|---|---|---|---|
| a* | DMPC | 100 | 677.9 | 677.9 | 1:80 | 1 |
| b | DMPC | 40 | 646.8 | 646.8 | 1:73.5 | 0.877 |
|   | PC14:1 | 50 | 645.2 |   |   |   |
|   | Cholesterol | 10 | 386.7 |   |   |   |
| c | PC14:1 | 90 | 673.9 | 645.2 | 1:67 | 0.797 |
|   | Cholesterol | 10 | 386.7 |   |   |   |

*MSP1D1/DMPC nanodisc taken as reference for size comparison.

TABLE S3

Reduction in total mass of nanodisc calculated for a range of measured masses of the MSP1D1 DMPC nanodisc. All values are given in kDa. SEC, DLS, NMR, and native MS data are from the literature.

| MSP1D1 mass | Technique | MSP1D1 lipid mass | Exp. MSP1ΔH5 lipid mass | | | Exp. MSP1ΔH5 nanodisc mass | | |
|---|---|---|---|---|---|---|---|---|
|   |   |   | SEC | DLS | EM | SEC | DLS | EM |
| 141.0 | iSCAMS | 93.9 | 74.6 | 72.9 | 67.4 | 116.6 | 114.9 | 109.4 |
| 124.0 | SEC | 76.9 | 61.1 | 59.7 | 55.2 | 103.1 | 101.7 | 97.2 |
| 126.0 | DLS | 78.9 | 62.7 | 61.2 | 56.6 | 104.7 | 103.2 | 98.6 |
| 149.5 | Native MS | 102.4 | 81.4 | 79.5 | 73.5 | 123.3 | 121.5 | 115.5 |
| 158.0 | NMR | 110.9 | 88.1 | 86.1 | 79.6 | 130.1 | 128.1 | 121.6 |

TABLE S4

Size comparison for lipid nanodiscs. Reduction in area of lipid bilayer patch in nanodisc with reduction in size of scaffold protein, calculated from reduction in hydrodynamic diameter as measured by SEC, DLS or EM.

| Technique | MSP1D1 D/nm | MSP1D1 $R_{lo}$/nm | MSP1ΔH5 D/nm | MSP1ΔH5 $R_{lo}$/nm | Ratio of lipid areas: MSP1ΔH5/MSP1D1 |
|---|---|---|---|---|---|
| SEC | 10.2 | 4.6 | 9.2 | 4.1 | 0.79 |
| DLS | 9.4 | 4.2 | 8.4 | 3.7 | 0.78 |
| EM | 9.5 | 4.25 | 8.2 | 3.6 | 0.72 |

D = diameter, $R_{lo}$ = radius of lipid-only content assuming the belt protein contributes 0.5 nm to the radius.

TABLE S5

Composition b predictions. All values are given in kDa.

| Mass of MSP1D1 | Lipid mass in MSP1D1 nanodisc | Expected lipid mass | Expected nanodisc mass |
|---|---|---|---|
| 141.0 | 93.9 | 82.3 | 129.4 |
| 124.0 | 76.9 | 67.4 | 114.5 |
| 126.0 | 78.9 | 69.2 | 116.3 |
| 149.5 | 102.4 | 89.8 | 136.9 |
| 158.0 | 110.9 | 97.2 | 144.3 |

TABLE S6

Composition c predictions. All values are given in kDa.

| Mass of MSP1D1 | Lipid mass in MSP1D1 nanodisc | Expected lipid mass | Expected nanodisc mass |
|---|---|---|---|
| 141.0 | 93.9 | 74.9 | 121.9 |
| 124.0 | 76.9 | 61.3 | 108.4 |
| 126.0 | 78.9 | 62.9 | 110.0 |
| 149.5 | 102.4 | 81.6 | 128.7 |
| 158.0 | 110.9 | 88.4 | 135.5 |

TABLE S7

Contrast-mass conversions (linear fit parameters to a contrast vs mass calibration plot as shown in FIG. 11A) for all data shown in FIG. 11. The different datasets were taken at different times, and as a result of the use of partial reflectors of different transmissivity, oxidation of the partial reflector, and minor drifts in alignment, the values for converting between mass and contrast were different over time. The setup was calibrated for each measurement using the procedure outlined for FIG. 11A, and for ease and consistency of display the contrasts shown for each measurement in FIGS. 11 and 18 were normalized to the contrast as in FIG. 10.

| FIGS. | Description | Slope /kDa$^{-1}$ | Intercept |
|---|---|---|---|
| 1, 2B, S5C | BSA; streptavidin-biotin binding, | 6.5651E−05 | 4.2324E−04 |
| 2A, S5A | Representative Calibration | 2.0529E−05 | 3.3099E−04 |
| 2C, S5D | Lipid nanodiscs | 1.6483E−05 | 0.0000E+00 |
| 2D, S5E | Env +/− kifunensine comparison | 1.5410E−05 | 0.0000E+00 |

TABLE S8

Abbreviations used in FIG. 2.

| Abbreviation | Meaning | Description |
|---|---|---|
| SEC | size-exclusion chromatography | Experimental techniques used in the literature for |
| DLS | dynamic light scattering | |
| MS | (native) mass spectrometry | mass determination of the MSP1D1/DMPC nanodisc |
| NMR | nuclear magnetic resonance | |
| MSP1D1 | Membrane scaffold protein (MSP) 1 with the first 11 N-terminal amino acids removed, as described in (51) | Membrane scaffold proteins (MSPs) used to make the lipid nanodiscs |
| MSP1ΔH5 | MSP1D1 with the 5th α-helix deleted, as described in (49) | |
| DMPC | 1,2-dimyristoyl-sn-glycero-3-phosphocholine | Lipids used in the lipid nanodiscs |
| PC14:1 | 1,2-dimyristoleoyl-sn-glycero-3-phosphocholine | |
| Chol | Cholesterol | |
| DSG3 | desmoglein-3 | Biotinylated peptides in FIG. 2D* |
| ACTH | adrenocorticotropic hormone | |

The invention claimed is:

1. A method of characterizing interactions and/or assembly of individual biomolecules using an interferometric light scattering microscope, said interferometric light scattering microscope comprising:
    a sample holder for holding a sample in a sample location;
    an illumination source arranged to provide illuminating light;
    a detector;
    an optical system being arranged to direct illuminating light onto the sample location and being arranged to collect output light in reflection, the output light comprising both light scattered from the sample location and illuminating light reflected from the sample location, and to direct the output light to the detector; and
    a spatial filter positioned to filter the output light, the spatial filter being arranged to pass output light but with a reduction in intensity that is greater within a predetermined numerical aperture than at larger numerical apertures.

2. The method according to claim 1, wherein said method permits spatiotemporal characterization of the interactions of the biomolecules.

3. The method according to claim 1, wherein said method permits the characterization of the interactions of the biomolecules in low-scattering in vitro conditions.

4. The method according to claim 1, wherein said method permits the characterization of a distribution of complexes of biomolecules at high dynamic range.

5. The method according to claim 1, wherein said method permits the characterization of the molecular dynamics of the interactions of biomolecules.

6. The method according to claim 1, wherein the interactions of the biomolecule include glycoprotein cross-linking, amyloidogenic protein aggregation, and/or actin polymerization.

7. The method according to claim 1, wherein the biomolecule is a single biomolecule.

8. The method according to claim 1, wherein said biomolecule is a single protein.

9. The method according to claim 1, wherein said biomolecule is a glycoprotein.

10. The method according to claim 1, wherein the biomolecule assembles into an oligomeric species.

11. A method according to claim 1, wherein the spatial filter is arranged to pass output light with a reduction in intensity within said predetermined numerical aperture to $10^{-2}$ of the incident intensity or less.

12. A method according to claim 1, wherein the spatial filter is arranged to pass output light with a reduction in intensity within said predetermined numerical aperture to $10^{-4}$ of the incident intensity or more.

13. A method according to claim 1, wherein the predetermined numerical aperture is less than 1.

14. A method according to claim 1, wherein the illuminating light is spatially and temporally coherent.

15. A method according to claim 1, wherein the optical system comprises a beam splitter arranged to split the optical paths for the illuminating light and the output light, the spatial filter being part of the beam splitter.

16. A method of identifying an oligomeric species in a sample by quantifying the mass of the species using an interferometric light scattering microscope, the interferometric light scattering microscope comprising:
   a sample holder for holding the sample in a sample location;
   an illumination source arranged to provide illuminating light;
   a detector;
   an optical system being arranged to direct illuminating light onto the sample location and being arranged to collect output light in reflection, the output light comprising both light scattered from the sample location and illuminating light reflected from the sample location, and to direct the output light to the detector; and
   a spatial filter positioned to filter the output light, the spatial filter being arranged to pass output light but with a reduction in intensity that is greater within a predetermined numerical aperture than at larger numerical apertures.

17. The method according to claim 16, wherein said oligomeric species is comprised of protein.

18. The method according to claim 16 wherein the oligomer is assembled from multiple components.

19. The method according to claim 16 wherein the oligomer is assembled from envelope or capsid proteins.

20. The method according to claim 16 wherein the oligomeric species is a membrane scaffold protein.

\* \* \* \* \*